(12) United States Patent
Takeda et al.

(10) Patent No.: US 7,069,400 B2
(45) Date of Patent: Jun. 27, 2006

(54) DATA PROCESSING SYSTEM

(75) Inventors: Takahiko Takeda, Minamiashigara (JP); Toru Suzuki, Odawara (JP); Hidenori Suzuki, Atami (JP)

(73) Assignee: Hitachi, Ltd., Tokyo (JP)

( * ) Notice: Subject to any disclaimer, the term of this patent is extended or adjusted under 35 U.S.C. 154(b) by 119 days.

(21) Appl. No.: 10/868,916

(22) Filed: Jun. 17, 2004

(65) Prior Publication Data
US 2005/0240740 A1  Oct. 27, 2005

(30) Foreign Application Priority Data
Apr. 22, 2004 (JP) .............................. 2004-126218

(51) Int. Cl.
*G06G 12/00* (2006.01)

(52) U.S. Cl. .................. 711/161; 707/204; 711/114; 711/161; 711/162; 714/6

(58) Field of Classification Search ................ 707/204; 711/114, 161, 162; 714/6
See application file for complete search history.

(56) References Cited

U.S. PATENT DOCUMENTS 6,052,758 A   4/2000  Crockett et al.
2004/0024975 A1  2/2004  Morishita et al.
2004/0034808 A1  2/2004  Day, III et al.
2004/0250034 A1  12/2004  Yagawa et al.
2004/0260902 A1  12/2004  Stanley et al.
2005/0038968 A1  2/2005  Iwamura et al.
2005/0081091 A1  4/2005  Bartfai et al.
2005/0120093 A1  6/2005  Nakano et al.
2005/0160248 A1  7/2005  Yamagami

*Primary Examiner*—Kevin Verbrugge
*Assistant Examiner*—Mehdi Namazi
(74) *Attorney, Agent, or Firm*—Mattingly, Stanger, Malur & Brundidge, P.C.

(57) ABSTRACT

In the data processing system which maintains data duplication between sites having a host computer and a storage apparatus, transfer-data volume and cost in communication line between the sites are controlled and the load of both primary and secondary hosts is controlled, and a data update management function at the secondary site side is realized. In the primary site, a primary DKC of primary storage apparatus stores an update data in a primary side file when a primary user data is updated from a primary host. Being asynchronous with this update, a secondary remote copy program of a primary remote copy program and an intermediate processing section remote-copies and accumulates the update data in a secondary side file. A data reflection program of a secondary host reads the accumulated data and commands a secondary DKC of a secondary storage apparatus to reflect it on a secondary user data and stores the update information in a secondary log data.

11 Claims, 11 Drawing Sheets

| primary logical volume number | secondary logical volume number | starting cylinder head number on secondary logical volume |
|---|---|---|
| 00 | 80 | 00 · 0 |
| 01 | 90 | 00 · 0 |
| 02 | 90 | 100 · 0 |

DATA PROCESSING SYSTEM

CROSS-REFERENCE TO RELATED APPLICATION

The present application claims priority from Japanese Patent Application No. JP 2004-126218 filed on Apr. 22, 2004, the content of which is hereby incorporated by reference into this application.

TECHNICAL FIELD OF THE INVENTION

The present invention relates to a data processing system having a plurality of storage apparatuses for storing data, and more in particular, it relates to a technology for copying the data between sites and maintaining the duplication thereof.

BACKGROUND OF THE INVENTION

In general, in recent years, a technology for copying a data between information processing systems and maintaining the duplication thereof in order to maintain a data and a service even in the case where failures develop due to disasters and the like in the information processing system to maintain the data. As such a technology, there is the technology, which performs the remote copying of a data between remote sites having a storage apparatus respectively and maintains the duplication thereof. For example, as a state, the side which maintains a duplication object data is taken as "original (primary)", and the side which maintains a duplication is taken as "duplication (secondary)", and a duplication data (secondary user data) on a user data (primary user data) maintained by the primary storage apparatus of the primary site is maintained at the secondary storage apparatus of the secondary site.

As for a technology for duplicating the data, in a data duplicating system initiated by a primary host computer, when updating the user data, it is necessary to write an update data on both the primary and the secondary storage apparatuses from the primary host computer. Consequently, even in order to carry out the service for the users (business enterprises and individuals), a load of the primary host computer such as an increase in the number of I/O (input and output) processing accompanied by the data duplicating, a pressure given to the memory bus of the primary host computer and the like becomes large.

As a technology for performing the copying of the user data and maintaining the duplication thereof between the primary and secondary sites in the data processing system where the information processing systems having the host computer and the storage apparatus respectively are disposed at remote sites, there are a remote copy processing system (hereinafter referred to as a storage base copy) initiated by the storage apparatus and a remote copy processing system (hereinafter referred to as a secondary host base copy) initiated by a secondary host computer, on which the present inventors have worked extensively as a prerequisite technology of the present invention.

With respect to the storage base copy between the primary and secondary sites, when the storage apparatus updates the primary user data from the primary host computer, an update data (a data written on an update position in the primary user data) received from the primary host computer is directly remote-copied for the secondary storage apparatus through a communication link between the primary and secondary storage apparatuses, and by allowing the update data to be reflected on the secondary user data, a data synchronization of the primary and secondary user data is performed. In this processing system, there is no load of the primary host computer accompanied with the processing of transferring the update data of the primary user data in the primary site to the secondary storage apparatus and reflecting it on the secondary user data.

With respect to the secondary host computer, the secondary host computer reads (copies) the update data of the primary user data in the primary storage apparatus by a remote through the communication link between the primary and secondary sites, and by allowing this update data to be reflected on the secondary user data of the secondary storage apparatus, the data synchronization between the primary and secondary user data is performed. In this processing system, since the primary host computer does not need to coordinate with the processing of transferring the update data of the primary data to the secondary site side and reflecting it on the secondary user data, there is no load accompanied with this processing. In the specification of the U.S. Pat. No. 6,052,758, there is disclosed a technology corresponding to the secondary host base copy.

SUMMARY OF THE INVENTION

In the above-described storage base copy, since the update information, that is, the system information other than the user data has to be transferred to the secondary storage apparatus of the secondary site in addition to the update data for the primary user data in the primary site, that is, the primary host computer and the primary storage apparatus, there is a problem in that the volume of transmission data increases by that much in a communication line between the sites, thereby increasing a line cost or a system running cost. On the other hand, in the above-described secondary host base copy, since the secondary host computer needs to perform an I/O processing for remote reading of the update data through the communication link between the primary and secondary sites in addition to the processing of reflecting the update data of the primary user data on the secondary user data so as to be data-synchronized, there is a problem in that a load of the secondary host computer becomes so large to cause a lowering in the processing efficiency.

The present invention has been made in view of the above-described problems, and it is an object of the present invention to provide a technology where, in the data processing system to perform a data copying and maintaining a duplication thereof between the sites having a host computer and a storage apparatus, an increase in the volume of transfer data and the line cost in a communication line, which becomes a problem in the case of the storage base copy, is controlled, and an increase in the load by the I/O processing of reading the data from the primary storage apparatus by the secondary host computer and the like, which becomes a problem in the case of the secondary host base copy, is controlled, and the transfer of the data is effectively performed while maintaining the matching properties of the data, and the data is duplicated, and a data update management function at the secondary site side can be realized.

Further, it is another object of the present invention to provide a technology which can realize a point-in-time recovery function that allows a data to be restored to an update point time in the past based on the secondary user data in the data processing system.

From among the inventions disclosed in the present application, the outline of the representative invention will be described simply as follows.

To achieve the above-described object, the present invention is a data processing system for performing the copying of data between the sites each having a host computer and a storage apparatus and maintaining a duplication thereof, and is characterized by comprising: a primary site comprising a primary host computer and a primary storage apparatus comprising a control section (storage unit controller) and a storage unit connected to the host computer and storing the primary user data of a duplication object in a storage area; a secondary site comprising a secondary host computer and a secondary storage apparatus comprising a control section (storage unit controller) and a storage unit connected to the secondary host computer and storing a duplication of the primary user data in a storage area as a secondary user data; and an intermediate processing section connected to the primary storage apparatus through the communication link and connected to the secondary host computer, wherein, after having updated the primary user data of primary storage apparatus from the primary host computer in the primary site, the processing of transferring the update data to the secondary site side as an object copy data is performed by the processing of transferring the updated data to the intermediate processing section by a remote copy processing performed mainly by the primary storage apparatus, and the processing of allowing this updated data transferred and accumulated in the intermediate processing section to be reflected on the secondary user data and synchronized with the primary user data side, that is, the processing of updating the data of the secondary user data is performed by the processing of reading the accumulated data initiated by the secondary host computer and commanding the secondary storage apparatus to reflect it. By such a data duplication processing, separate roles of the processing are defined between the primary and the secondary host computers and storage apparatuses so that the load is dispersed and reduced.

The intermediate processing section is disposed and connected by taking into consideration a position which is close to the secondary site in distance between the primary site and the secondary site, that is, a position in which a distance delay time in communications is short and a load of the I/O processing for the data transfer is small, and performs the processing of transfer relay and temporary storing the update data, and plays a roll of balancing the processing of the primary and secondary sites when the update data is transferred between the primary and secondary sites.

When performing the update of the primary user data based on a command such as a writing command and the like from a data processing program of the primary host computer, the control section of the primary storage apparatus accumulates the data, that is, a written data for the update position (update address) of the primary user data as an object copy (object transfer) data in a cache memory provided in the storage area, for example, the control section within the primary storage apparatus as a primary side file. When accumulating this update data, the control section of the primary storage apparatus prepares management information (object copy data management information) for managing the transfer (copy or transfer) of this update data by a remote to the secondary site side, the storing of this update data in the storage area, the reflecting of this update data on the secondary user data and the like, and stores this update data together with the management information. The management information is prepared to include an update serial number or update time as an identifier of an update sequence of the user data (primary user data and duplicated secondary user data corresponding to the primary user data), an update address of the user data, an accumulating address of the update data, and the like. The management information is the information minimally needed for performing the processing of reflecting the update data on the secondary data at the secondary site while maintaining a matching property of the data. The processing of reflecting the update data on the secondary user data according to the update sequential number or the update time at the secondary site, that is, the writing of the update data on the secondary data according to the same update sequence as the update sequence in the primary user data is performed so that the matching properties of the data can be maintained. With respect to the update sequential number or the update time, either one may be maintained.

In timing asynchronous with the update data of the primary user data, the control section and the intermediate processing section of the primary storage apparatus remote-copy or move and accumulate the copy object data, that is, the update data and its management information in the storage area owned by the intermediate processing section through the communication link. The intermediate processing section stores a received update data as a secondary side file, and further, based on the received management information, performs the preparation of new management information or the update of the received management information, and stores it together with the update data. For example, with the identifier of the update sequence remained as it is in the management information, the information such as an update data storing address and the like showing a storing position of the update data in the storage area of the intermediate processing section is prepared.

The asynchronous transfer of the update data and its management information between the primary storage apparatus and the intermediate processing section is, for example, performed such that, based on a request for transfer of the update data to the control section of the primary storage apparatus from the intermediate processing section, the control section of the primary storage apparatus decides the update data and its management information which are the transfer object from the management information, and retrieves them from the storage area, and transmits them as a response. Alternatively, the asynchronous transfer is performed based on the request for transfer of the update data to the intermediate processing section from the control section of the primary storage apparatus. The object copy data transferred for every request is, for example, taken as the update data for the prescribed number of update times or may be taken as the update data for the prescribed volume of data. An issuance of the request is made, for example, for every definite period of time or may be made for every occurrence of the update. Further, the issuance may be made when the load of the primary storage apparatus and the intermediate processing section is in a state of being small. The primary storage apparatus and the intermediate processing section may be stored with the prescribed volume or quantity of update data.

A data reflection program of the secondary host computer and the intermediate processing section perform the processing of transferring (copying or moving) the update data and its management information accumulated in the intermediate processing section through the connection path to the secondary storage apparatus through the secondary host computer, and command the control section of the secondary storage apparatus to perform the processing of reflecting the corresponding update data on the secondary user data according to the update sequence in the primary user data based on that management information.

The transfer and reflection processing of the update data and its the management information between the secondary host computer and the intermediate processing section are, for example, performed such that, based on the request to the intermediate processing section from the secondary host computer, the intermediate processing section decides the update data of the transfer object from the management information and retrieves it from the storage area, and this update data is read and obtained by the secondary host computer. Alternatively, the processing is performed based on the request to the secondary host computer from the intermediate processing section. The copy object data transferred for every request should be, for example, the update data for the prescribed number of update times. Alternatively, it may be taken as the update data for the prescribed volume of data. The issuance of this request is, for example, made for every definite period of time. Further, it may be made for every occurrence of the update. Further, it may be made when the load of the intermediate processing section, the secondary host computer and the secondary storage apparatus is in a state of being small. The storage area of the intermediate processing section, the secondary host computer and the secondary storage apparatus may be stored with the prescribed volume or quantity of update data.

When the data reflection program of the secondary host computer obtains the update data and its the management information from the intermediate processing section, with reference to that management information, the data reflection program decides the update data to be reflected on the secondary user data based on the update sequence identifier, and based on pair conversion information, performs primary and secondary pair logical volumes, that is, an address conversion between the primary user data and the corresponding duplication secondary user data, and after that, issues a command to reflect the update data on the control section of the secondary storage apparatus. The secondary storage apparatus obeys the command for the update data reflection processing and reflects the update data on the secondary user data stored in the storage unit, and updates the data and returns the processing result to the secondary host.

The primary user data and the secondary user data constitute a pair logical volume on a duplication and, for example, the secondary host computer maintains the pair conversion information which is the corresponding information such as the address conversion and the like. When reflecting the update data on the secondary user data, the secondary host computer makes a decision on a logical volume of the update object and an update position from the pair conversion information. Further, the maintenance of the pair conversion information and the address conversion may be performed by the intermediate processing section and the control section of the secondary storage apparatus and the like.

The transfer of the update data among the primary storage apparatus, the intermediate processing section, the secondary host computer and the secondary storage apparatus may be made by a copy (the data at the sender is left) or a movement (the data at the sender is not left). In the case where the transfer of the update data is made by a copy, a generation management of the update is performed.

Further, the data processing system of the present invention is characterized in that, apart from the fact that the control section of the primary storage apparatus performs the update of the data of the primary user data based on a writing command from the data processing program of the primary host computer, the primary host computer generates update information (log data) regarding the update of the primary user data, and this information is stored in the prescribed memory area within the primary storage apparatus, and moreover, accompanied with the update of the secondary user data of the secondary storage apparatus, that is, the reflection processing of the update data, the secondary host computer or the secondary storage apparatus based on the command from the secondary host computer generates the update information (log data) regarding the update and stores it in the storage area within the secondary storage apparatus. By generating and maintaining the update information on the secondary user data at the secondary site side, a data update management function is realized in the secondary site, thereby assisting the restoration of the system or the data at the time of disasters and the like.

Further, the data processing system of the present invention is characterized in that, when updating the secondary user data of the secondary storage apparatus, the secondary host computer stores a data before update in the storage area within the secondary storage apparatus as an old site file prior to the writing the update data on the update position by the secondary storage apparatus, and when desiring to restore the secondary user data to the data state as in the time of updating in the past, the secondary host computer allows the secondary user data to perform an update by tracing back the update sequence by using the data before update stored within the secondary storage apparatus, thereby performing the processing of restoring the secondary user data to a data state in the update point of time in the past.

Further, the data processing system of the present invention is characterized in that, when desiring to advance the secondary user data to the data state as in the time where the primary user data has been updated, the secondary host computer obtains the update data accumulated in the intermediate processing section and its management information and follows the update sequence.

Further, the data processing system of the present invention may be constituted such that the intermediate processing section is constituted independently from the secondary storage apparatus within the secondary site, and the secondary host computer is connected to the secondary storage apparatus through a network or a private line such as a local area network and the like. Further, the data processing system of the present invention may be such that the intermediate processing section is constituted within the control section of the secondary storage apparatus within the secondary site. Further, the data processing system of the present invention may be constituted such that the intermediate processing section is placed at an intermediate position between the primary site and the secondary site, and is connected to the primary storage apparatus by a first communication link, and is connected to the secondary host computer by a second communication link.

From among the inventions disclosed in the present application, the advantages of the representative invention will be summarized as follows.

According to the present invention, since the update data on the user data is transferred to the secondary site side by making the best use of the data transfer efficiency for a long distance by a remote copy processing initiated by the storage apparatus, the volume of transfer data and a line cost in the communication line between the primary and secondary sites are controlled, and moreover, the estimation of the amount used of the line is made easy and a system running cost can be controlled. At the same time, the increase in the load due to the I/O processing of reading the data from the primary storage apparatus by the secondary host computer and the like can be controlled, thereby preventing the processing efficiency from being lowered, and a data duplication can be performed by effectively performing the transfer of the data while maintaining the data matching properties. Further, the secondary host computer performs the processing of generating the update information, so that the data update management function in the secondary site side is realized, thereby assisting the recovery of the system or the data at the time of disasters and the like.

Further, according to the present invention, at the update time of the secondary user data, by storing the data before update in the storage area within the secondary storage apparatus, a point-in-time-recovery function in which the data before the update is restored to the data of the update point of time in the past can be realized based on the secondary user data.

BRIEF DESCRIPTIONS OF THE DRAWINGS

Figure 11:
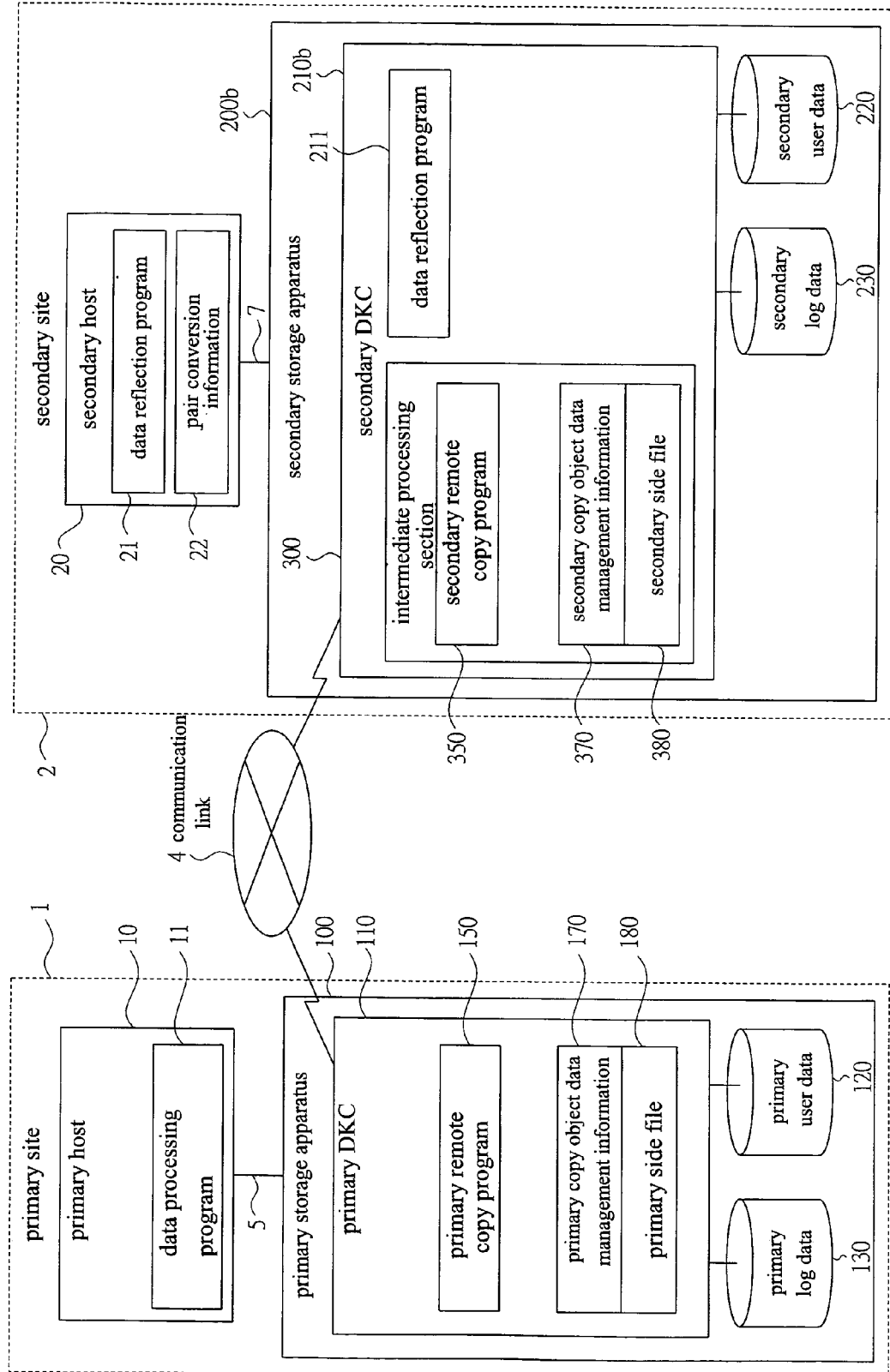
Figure 12:
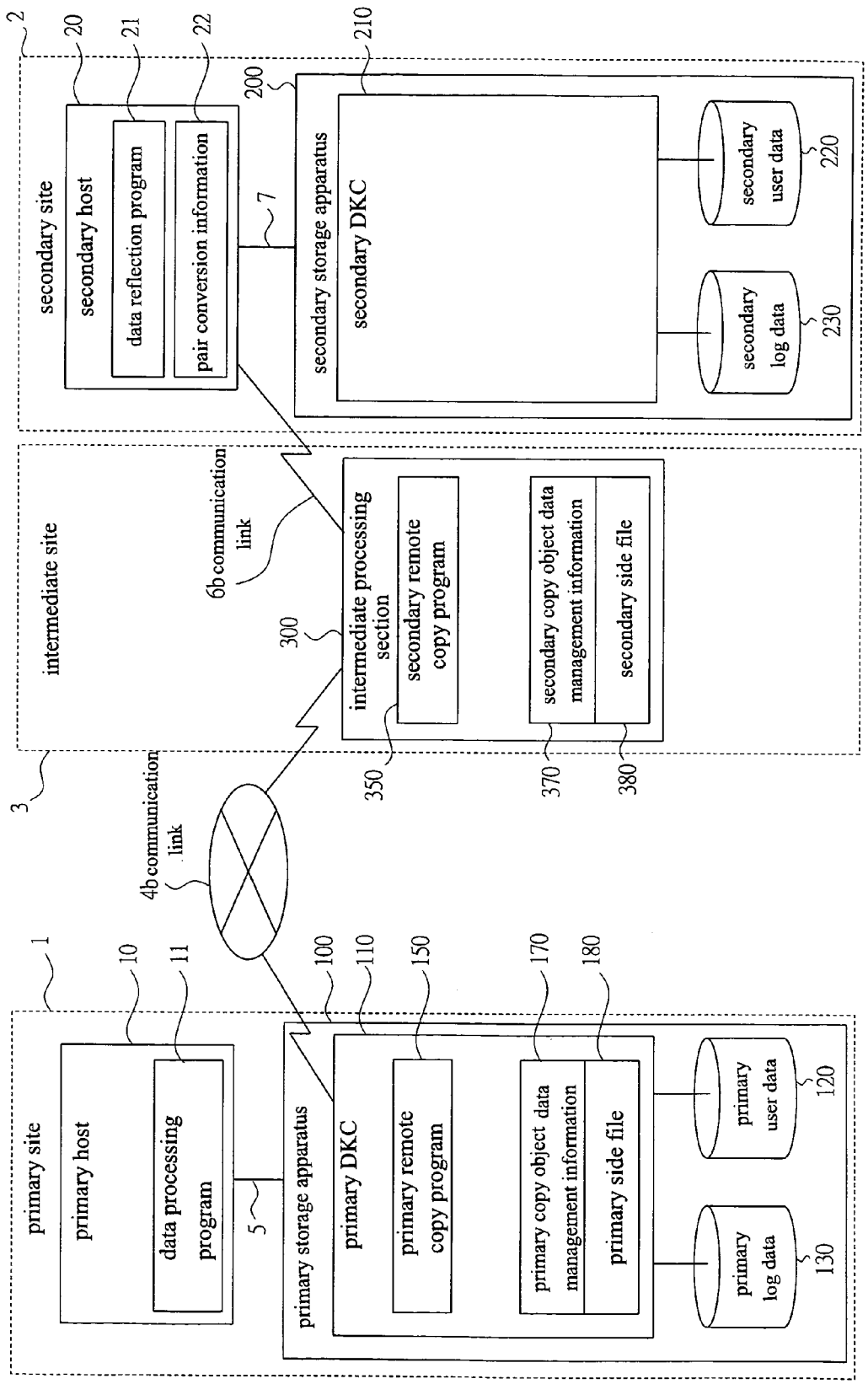

FIG. 11 is a view showing a whole constitution of the data processing system which is another embodiment of the present invention, and shows an embodiment in which the intermediate processing section is constituted as a part of a secondary DKC of a secondary storage apparatus within the secondary site; and FIG. 12 is a view showing a whole constitution of the data processing system which is another embodiment of the present invention, and shows an embodiment in which the intermediate processing section is placed at an intermediate side on a communication link between the primary and secondary sites as an independent processing section.

DESCRIPTION OF THE PREFERRED EMBODIMENTS

Hereinafter, embodiments of the present invention will be described in detail based on the accompanying drawings. Note that, in all the drawings for explaining about the embodiments, the same components are in principle attached with the same reference numerals, and the repeated explanations thereof will be omitted.

(Constitution of Data Processing System)

Figure 1:
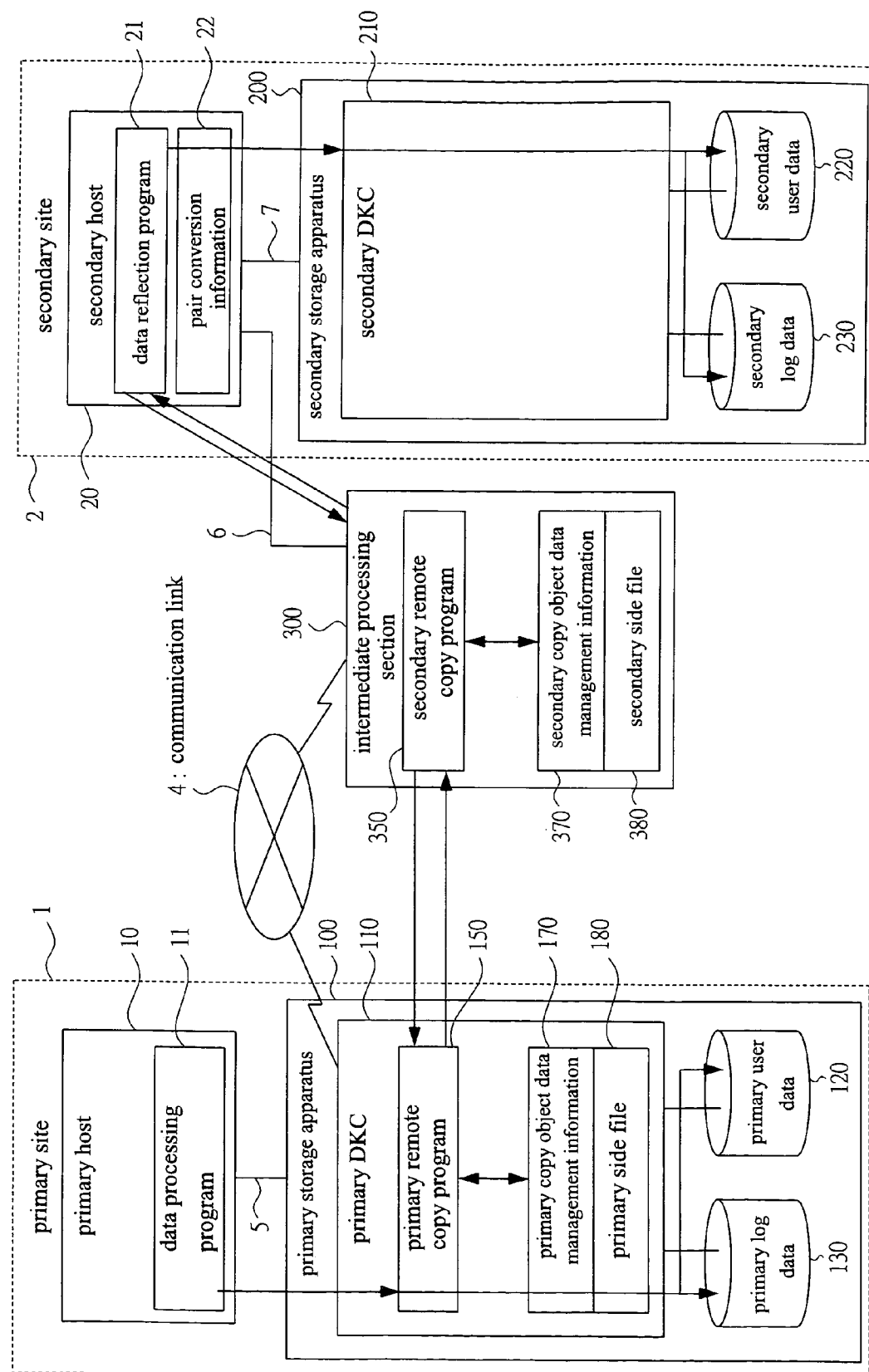
FIG. 1 is a view showing a whole constitution of the data processing system according to one embodiment of the present invention.

FIG. 1 shows a whole constitution of the data processing system in a representative embodiment of the present invention. The data processing system of the present embodiment is constituted by comprising a primary site 1, a secondary site 2, and an intermediate processing section 300, which are connected by communication means. The primary site 1 is an information processing system having a primary host (primary host computer) 10 and a primary storage apparatus 100, which are connected via a connection path 5. The secondary site 2 is an information processing system having a secondary host (secondary host computer) 20 and a secondary storage apparatus 200, which are connected via a connection path 7. The intermediate processing section 300 is an information processing system, which is connected to the primary storage apparatus 100 via a communication link 4 for a remote communication, and is further connected to the secondary host 20 via a connection path 6. The intermediate processing section 300 is disposed closer to the secondary site in distance than the primary site.

The primary host 10 has a data processing program 11. The primary host 10 is a computer comprising a processor, a memory, a communication interface, an I/O device, an OS and an application program for using the primary storage apparatus 100 and the like, and realizes various functions by executing the data processing program 11 and other programs by the processor. The data processing program 11 is a program, which accesses to the primary storage apparatus 100 so as to perform a processing for the data such as a primary user data 120 and the like stored in the primary storage apparatus 100 in order to provide service to the users (business enterprises and individuals) who use the primary host 10.

The primary storage apparatus 100 is a storage system comprising a control section (storage unit controller) and more than one storage units (disc drives) connected thereto as a physical structure. The primary storage apparatus has a primary DKC (primary disc controller) 110 as a control section. The primary DKC 110 is connected to a primary host 10 through a connection path 5, and is also connected to the storage unit via an internal connection line. The primary DKC 110 performs the control of a data reading, writing and the like for the storage unit, and the RAID control (control of a disc array, that is, a plurality of storage units) and the like. Further, the primary DKC 110 is connected to a communication link 4, and through this link, it can establish communication with the intermediate processing section 300 for a remote copy processing to be described later. The primary storage apparatus 100 stores data as a logical volume in the storage areas provided by more than one storage units. The logical volume is a unit to be logically treated, into which a physical storage area, namely a physical volume is freely partitioned, and a correspondence between a physical address and a logical address is managed by the primary storage apparatus 100. The primary host 10 can gain data-access to the primary storage apparatus 100 by designation of the logical address. In the present embodiment, as a logical volume, a user data which is a duplication object is stored in the primary storage apparatus 100 as a primary user data 120, and accompanied with an update of the primary user data 120, an update log generated based on a command from the primary host 10 is stored as a primary log data 130. Note that, in the drawing, the storage unit is not illustrated, but a single logical volume for the data to be stored in each storage apparatus is simply illustrated.

The secondary host 20 has a data reflection program 21 and pair conversion information 22. The secondary host 20, as similar to the primary host 10, is a computer comprising a processor, a memory, a communication interface, an I/O device, an OS and an application program for using the secondary storage apparatus 200 and the like, and realizes various functions by executing the program by the processor. The data reflection program 21 establishes communication with the intermediate processing section 300 through the connection path 6, and further establishes communication with the secondary storage apparatus 200 through the connection path 7, and performs the processing of reflecting the update data from the primary site 1 side on the secondary user data 220. It also performs a processing for a data recovery function by the data reflection program 22 at the time of disturbances to be described later, thereby making it possible to execute a data recovery processing based on the secondary user data 220 when the disturbances and the like occur at the primary site 1. The pair conversion information 22 is the information for performing an address conversion and the like between the primary user data 120 and the secondary user data 220, which are a pair logical volume. What is meant by the pair logical volume is a pair of a primary logical volume being a duplication object and a secondary logical volume being its duplication data.

The secondary storage apparatus 200, as similar to the primary storage apparatus 100, is a storage system comprising a control section (storage unit controller) and more than one storage units (disc drives) connected thereto as a physical structure. The secondary storage apparatus 200 has a secondary DKC (secondary disc controller) 210 as a control section. The secondary DKC 210 is connected to a secondary host 20 through a connection path 7, and is also connected to the storage unit. The secondary DKC 210 controls data reading, writing and the like for the storage unit, and performs the RAID control and the like. The secondary storage apparatus 200 stores data as a logical volume in the storage areas provided by more than one storage units. A correspondence between a physical address and a logical address is managed by the secondary storage apparatus 200. In the present embodiment, as a logical volume, a duplication of the primary user data is stored in the secondary storage apparatus 200 as a secondary user data 220, and an update log generated based on a command from the secondary host 20 is stored as a secondary log data 230.

The primary storage apparatus 100 has a primary remote copy program 150, primary copy object data management information 170, and a primary side file 180 in the primary DKC 110 as a logical constitution.

In the primary storage apparatus 100, the primary remote copy program 150 is a function to perform a remote copying of the update data initiated by the primary storage apparatus 100, and performs the processing of remote-coping a copy object data accumulated within the primary DKC 110, that is, the update data and its primary copy object data management information 170 for the intermediate processing section 300 which is a remote copy destination through the communication link 4 with a prescribed timing. The timing of executing the remote-copy processing is asynchronous with the update of the primary user data 120.

On the occasion of the update of the primary user data 120 based on a command from the primary host 10, the primary DKC 110 makes primary copy object data management information 170 for managing this update data as a copy object data in order to make this update data as a remote copy object for the secondary site 2 side, and accumulates and manages the prepared primary copy object data management information 170 in the storage area within the primary DKC 110. The primary DKC 110 chooses and retrieves the update data by referring to the primary copy object data management information 170 stored with the update data in the storage area.

The primary copy object data management information 170 and secondary copy object data management information 370 are the information which include an update serial number, an update time as an identifier of an update sequence in the primary user data 120 of an object, and an update address and the like in the user data of the object. This copy object data information (170 and 370) follows the movement of the update data toward the primary storage apparatus 100, the intermediate processing section 300, and the secondary host 20, and is information decodable even by the data reflection program 21 of the secondary host 20. The preparation of the primary copy object data management information 170 is performed by the primary DKC 110 accompanied by the occurrence of the update of the primary user data 120. Note that the system information such as the primary log data 130 and the like is the information generated and initiated by the primary host 10, and is different from the primary copy object data management information 170 generated by the primary storage apparatus 100. The primary copy object data management information 170 may be accumulated in order in the storage area by making a pair with the update data, or may be divided and accumulated into a separate storage area apart from the update data.

The update data is a data transferred to the primary storage apparatus 100 from the primary host 10 when the data processing program 11 of the primary host 10 issues a write (WR) command and the like to the primary KDC 110 and performs a writing on the primary user data 120 maintained in the storage area of the storage unit within the primary storage apparatus 100.

In the primary storage apparatus 100, a primary side file 180 is prepared to ensure update ordinality. In the case of the data processing system of the present embodiment, the primary host 10 is asynchronous with the I/O processing which updates the primary user data 120, and performs the processing of remote-coping (asynchronous remote-copying) the update data and its primary copy object data management information 170 which are the copy object data by the primary DKC 110 and the intermediate processing section 300. In this case, as against a state where the update data for the primary user data 120 is not stored as the primary side file 180 or is not transferred to the intermediate processing section, when an overwrite occurs again from the primary host 10, the update data before the overwrite is saved, and the primary side file 180 is prepared to generation-manage the update data. The primary side file 180, to simply explain, is a data which copies (backs up) an update data dm prior to receiving an update data dn by deciding that the ensuring of the update data reflection ordinality is needed in the case where, as against the update data dm written by a write (WR) command for the primary user data 120 at a certain point of time tm, a writing of the update data dn by a write (WR) command at the next point of time tn is performed again.

The update data stored in a storage address (storage position information) of the update data shown by the primary copy object data management information 170 stored by the primary DKC 110 of the primary storage apparatus 100 is dealt with as a copy object data. This data is transferred from the primary site 1 to the intermediate processing section 300 of the secondary site 2 side through the remote copy processing and stored, so that this update data is reflected on the secondary user data 220 at the secondary site 2 side, thereby performing a data synchronization with the corresponding primary user data 120.

In the primary DKC 110 of the primary storage apparatus 100, the utilization of only the update data and the primary copy object data management information 170 for the primary user data 120 reduces the absolute volume of the transfer data in the transfer of the data necessary for data duplication between the primary and secondary sites. The update data stored in the primary site 1 is transferred up to the secondary DKC 210 of the secondary storage apparatus 200 through the intermediate processing section 300 serving under the secondary host 20 and through the secondary host 20 by the remote copy processing performed mainly by the primary storage apparatus 100.

Note that there exist a plurality of cases for the content, condition, momentum and the like of the processing when the primary side file 180 is prepared in the primary storage apparatus 100, and shown in the present embodiment is one example of the processing.

The intermediate processing section 300 is a processing section under the secondary host 20, and has a processor, a memory, a communication interface and the like. The intermediate processing section 300 has a secondary remote copy program 350, secondary copy object management information 370, and a secondary side file 380 as a logical structure. The intermediate processing section 300 comprises a memory or a storage having a prescribed storage capacity for storing the update data and the secondary copy object data management information 370. The storage capacity of this memory is set according to the volume of the update data in every occurrence of the update or how many generations of the update data should be stored as the secondary side file 380 and the like.

The intermediate processing section 300 may be provided as a part within the secondary site or may be provided such that it is disposed on the communication link between the primary and secondary sites as a processing section independent from the secondary site 2. Further, it may be structured such that it is connected to the secondary host 20 via a connection path on a LAN within the secondary site or may be structured as a part of the secondary DKC 210 of the secondary storage apparatus 200. An embodiment in which the disposition and the connection of the intermediate processing section 300 are different will be described later.

The secondary remote copy program 350 of the intermediate processing section 300 receives the update data and its primary copy object data management information 170 in cooperation with the primary remote copy program 150 of the primary storage apparatus 100, and performs the processing of storing them in the storage area. The program 350 stores the received update data in the secondary side file 380, and prepares the secondary copy object data management information 370 based on the received primary copy object data management information 170 and stores it in the storage area. For example, the program 350 writes a value of the address, which stores the update data in the storage area of the intermediate processing section 300, within the secondary copy object data management information 370. Further, the secondary remote copy program 350 retrieves the update data and its secondary copy object data management information 270 stored in the storage area in cooperation with the data reflection program 21 of the secondary host 20 of the secondary site 2, and performs the processing of transferring them to the secondary host 20.

By reading the update data of the secondary side file 380 stored in the intermediate processing section 300 located at a short distance, the data reflection program 21 of the secondary host 20 obtains the update data without slowing the data transfer time due to a distance delay time between the primary and secondary sites, and therefore, the load of the secondary host 20 is made small.

When being updated at the primary user data 120 in the primary site 1 side, the secondary user data 220 matches, that is, data-synchronizes with the content of the update point of time of the primary user data 120 at the secondary site 2 side where that updated data undergoes the reflection processing by the secondary host 20 and the secondary storage 200 through the remote copy processing.

The primary and secondary host computers (10 and 20) are, for example, PC, a workstation, a mainframe computer and the like. Further, the control sections of the primary and secondary storage apparatuses (100 and 200) may be, to be more in detail, constituted by comprising channel adaptors to be connected to a plurality of host computers or other storage apparatuses, a cache memory for temporarily storing the data, a shared memory for storing control information and the like, a switch for performing a data transfer within the storage apparatus, a disc adaptor for controlling each storage unit, and a processing section for maintenance and management and the like. For example, the primary storage apparatus 100 stores the update data received from the primary host 10 by the channel adaptor through the connection path 5 in the cache memory, and this update data is read by the disc adaptor, and is processed by the method of writing it on the storage unit.

The user (manager) can perform the maintenance and management of the storage apparatuses (100 and 200) by the processing section or the terminal device for maintenance and management connected to the storage apparatuses (100 and 200). Further, the user can perform the maintenance and management for the storage apparatuses (100 and 200) by the hosts (10 and 20) connected to the storage apparatuses (100 and 200).

The primary log data 130 and the secondary log data 230 are the system information generated by the hosts (10 and 20) accompanied by the update of the user data (120 and 220). The primary log data 130 and the secondary log data 230 are the information showing an execution process of a program generated in the course of the data processing by the primary host 10 and the secondary host 20. This information is a data simply written on the storage area from the host side when seen from the primary DKC 110 and the secondary DKC 210.

In the data processing system of the present invention, the transfer of the update data of the primary user data 120 between the primary and secondary sites is performed mainly by the primary storage apparatus 100, and the remote copy processing is performed for the intermediate processing section 300, and the pair logical volume, that is, the processing of reflecting the update data on the secondary user data 210 is performed mainly by the data reflection program 21 operating on the secondary host 20. The transfer data in the communication line between the primary and secondary sites is the update data on the primary user data 120 and its management information (170 and 370) only, and the system information generated based on the primary host 10 such as the primary log data 130 and the like is not transferred. In this way, the volume of transfer data is controlled. The reflection processing of the update data in the secondary site 2 and the generation processing of the system information such as the secondary log data 230 and the like are performed based on the data reflection program 21 operating on the secondary host 20. In this way, the data update management mechanism and the date recovery function in the secondary site 2 are realized.

(Structure of Copy Object Data Management Information)

Figures 2, 3:
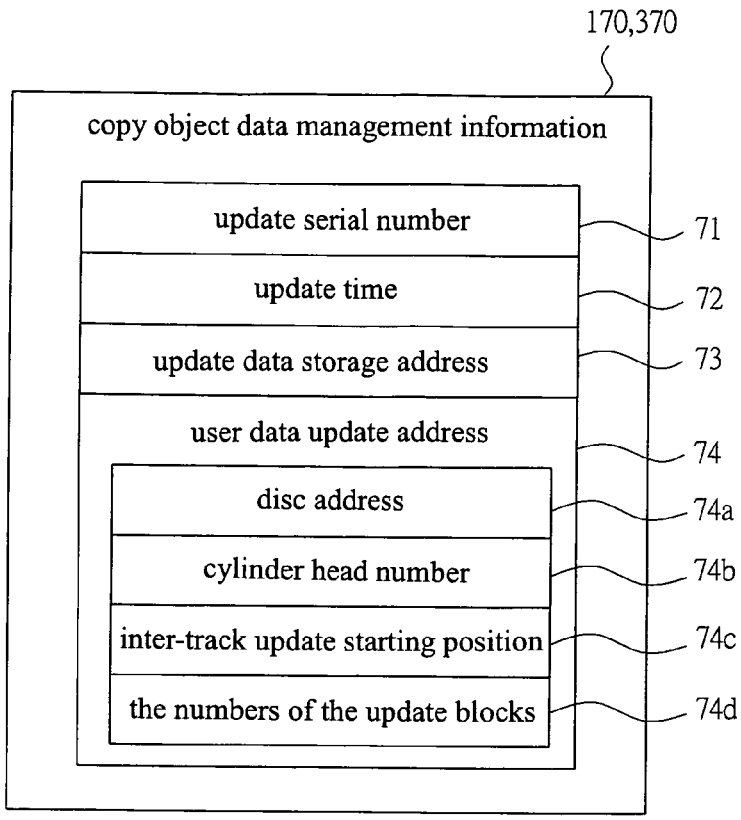
FIG. 2 is a view showing a constitutional example of copy object data management information in the data processing system according to one embodiment of the present invention.
FIG. 3 is a view showing a constitutional example of pair conversion information in the data processing system according to one embodiment of the present invention.

FIG. 2 shows a constitutional example of the primary or secondary copy object data management information (the primary copy object data management information 170 or the secondary copy object data management information 370). The primary or secondary copy object data management information (170 or 370) is the information prepared for maintaining and managing an attribute on the update data which is the copy object data received by the primary DKC 110 and the intermediate processing section 300. With respect to the copy object data management information for a certain update, the one which the primary DKC 110 side particularly prepares, maintains and refers is taken as the primary copy object data management information 170, and the other which the intermediate processing section 300 and the secondary DKC 210 sides prepare, maintain and refer is taken as the secondary copy object data management information 370. The copy object data management information (170 and 370) has an update serial number 71, an update time 72, an update data storage address 73, and a user data update address 74. The update serial number 71 and the update time 72 are an identifier of the update sequence of the data, and the management information may adopt an embodiment having either one only.

In the primary or secondary copy object data management information (170 or 370), the update serial number 71 is a serial number given to the update data by the primary remote copy program 150 operating on the primary DKC 110 as the identifier of the update sequence to ensure the update ordinality for the primary user data 120. In a time base, for every occurrence of the update of a certain primary user data 120, the update serial number 71 is given, for example, as s1, s2 . . . sn. The standard by which the primary remote copy program 150 decides the copy object data to be transferred in response to a request for read of the update data from the intermediate processing section 300 is a data having the youngest (the smallest) update serial number 71 from among the untransferred data in the primary storage apparatus 100. Even in the remote copy program 350 of the intermediate processing section 300, the copy data object to be transferred on the same standard in response to a request for read of the secondary side file 380 from the data reflection program 21 of the secondary host 20, that is, the update data to be transferred on the same standard is decided. The update serial number 71 is a number by which the data update sequence, that is, the update data reflection sequence for the secondary user data 220 by the data reflection program 21 can be executed in the same sequence as the data update sequence for the primary user data 120 by the data processing program 11.

The update time 72 is a time when the primary DKC 110 receives a write operation for the primary user data 120 from the data processing program 11 of the primary host 10, and, for example, if the primary host 10 is a mainframe computer, this time is given to the write command from the primary host 10. The data reflection processing performed at the secondary site side by maintaining the update sequence according to the update serial number 71 or the update time 72 makes it possible to maintain the data matching properties.

The update data storage address 73 shows a physical address of the storage area in which the update data is stored in the primary DKC 110 or the intermediate processing section 300. For example, when the update data is stored on the cache memory owned by the primary DKC 110 and the intermediate processing section 300, it shows either an address on the cache memory or a pointer to cache segment management information. The precise value changes depending upon whether or not it is primary or secondary.

The user update address 74 is the information, which shows an update position and range, where an update data is written on the logical volume in which the user data (120 and 220) is disposed within the storage apparatus (100 and 200). In the case of the present embodiment, the user update address 74 comprises a disc address 74a, a cylinder head number 74b, an intra-track update starting position 74c, and the number of the update block 74d. The user update address 74 may be shown by the logical address or by the physical address. The conversion between the logical address and the physical address is adequately performed in the primary and secondary DKC (110 and 210). The disc address 74a is an address or an identification number of a disc drive device of the object. The cylinder head number 74b is a cylinder head number in the object disc drive. The intra-track update starting point 74c is an intra-track starting position in the object cylinder head. The number of the update block 74d is an update range starting from the object intra-tack update starting point. The user data update address 74 is calculated by the primary remote copy program 150 from the content of a write I/O of the data processing program 11 in the case of the primary copy object data management information 170 for the update data of the primary user data 120, while in the case of the secondary copy object data management information 370 for the update data of the secondary user data 220, when this information is read from the intermediate processing section 300 by the data reflection program 21, the address 74 is calculated by performing the address conversion of the primary and secondary logical volume by using the pair conversion information 22 owned by the secondary host 20.

(Structure of Pair Conversion Information)

FIG. 3 shows an example of the structure of the pair conversion information 22. The pair conversion information 22 comprises a secondary logical volume number 22b stored with the secondary user data 220 for a primary logical volume number 22a stored with the primary user data 120, and a starting cylinder head number 22c on the secondary logical volume. Further, the pair conversion information 22 is maintained not on the secondary host 20, but on the intermediate processing section 300, and when the secondary remote copy program 350 receives the update data and the primary copy object data management information 170 which are the copy object data from the primary DKC 110, the secondary remote copy program 350 can adopt an embodiment to perform the primary and secondary pair volume address conversion.

In the case where the copy object data management information (170 and 370) prepared based on the primary DKC 110 is analyzed by the data reflection program 21 of the secondary host 20, the pair conversion information 22 is the information needed as far as the storage unit of the primary storage apparatus 100 and the storage unit of the secondary storage apparatus 200 are not structured by a single device, that is, as far as the device pair is not of a one-to-one single structure. Further, in the present embodiment, though the data reflection processing is performed mainly by the secondary host 20, the pair conversion information 22 is disposed within the secondary host 2, but even in the case of the embodiment where the intermediate processing section 300 or the secondary DKC 210 performs the data reflection processing, the pair conversion information 22 is needed, and in that case also, the same pair conversion information 22 is disposed at the position where the intermediate processing section 300 and the secondary DKC 210 are needed.

(Operation of Data Processing System)

Figure 4:
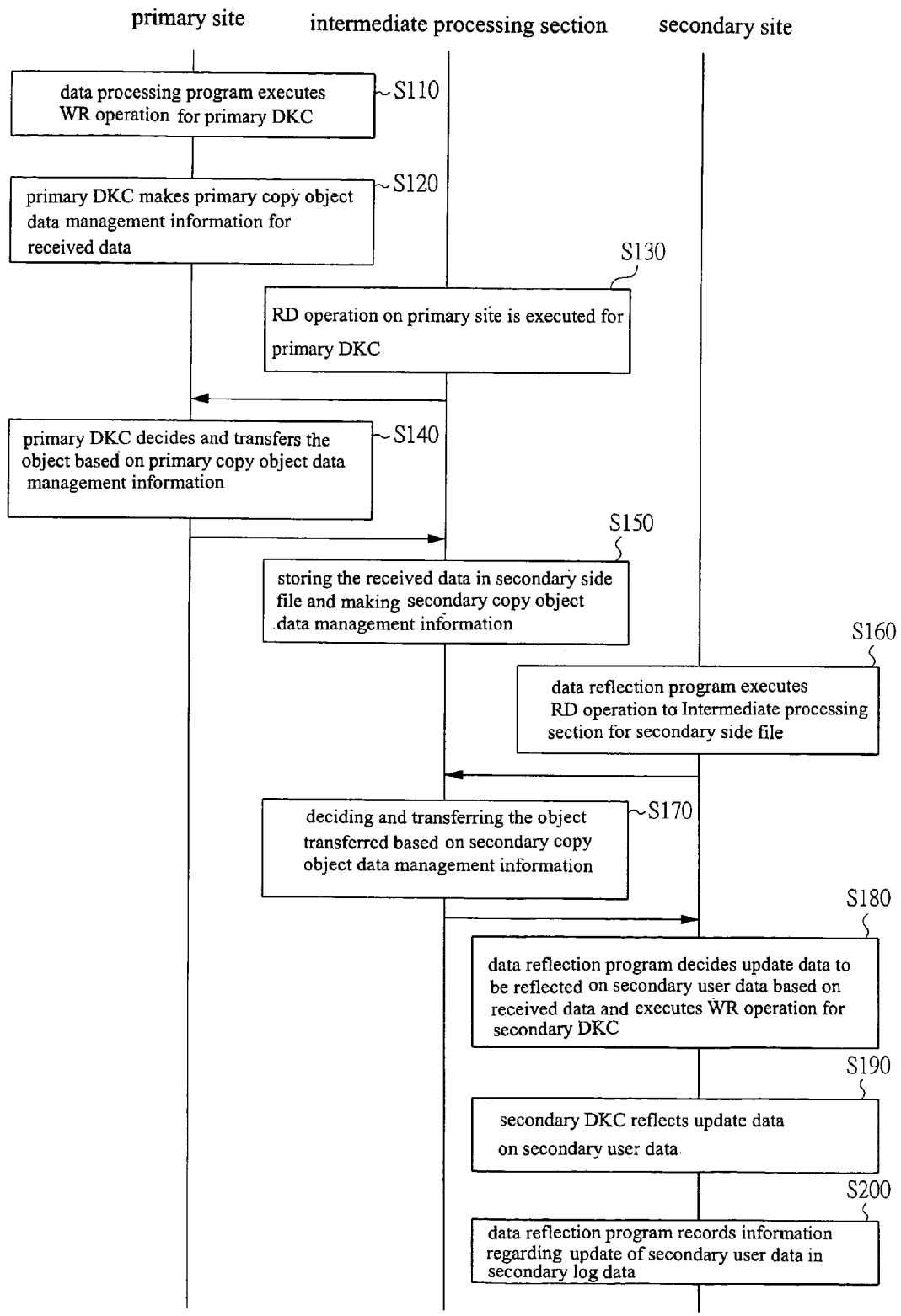
FIG. 4 is a sequential view showing a whole operation of the data processing system according to one embodiment of the present invention.

Next, the whole operation in the data processing system of the present embodiment will be described. FIG. 4 is a sequence drawing showing the whole operation in the data processing system of the present embodiment, and shows a processing procedure from the update of the primary user data 120 at the primary site 1 to the reflection of the update data on the secondary user data 220 at the secondary site 2.

First, the date processing program 11 operating on the primary host 1 performs a write operation for the update of the primary user data 120 stored in the primary storage apparatus 100. The data processing program 11 executes a write (WR) command for the data within the primary user data 120 for the primary DKC 110 (step S110). This write command is accompanied with a logical address of the object, that is, a user data update address, and an update data written for that position.

When a request for write is received from the primary host 10, the primary DKC 110 performs the processing of receiving the write I/O for this update, and prepares a reception data from the information of this write I/O, that is, the primary copy object data management information 170 for the management of the update data. This processing is a preparation for responding to a request for read of the update data from the intermediate processing section 300 (S120). The prepared primary copy object data management information 170 is stored in the storage area within the primary storage apparatus 100 in association with the update data.

On the other hand, as the primary side file 180, the intermediate processing section 300 issues a read (RD) operation for requesting the accumulation of the update data, if any, to be transferred to the primary DKC 110 through the communication link 4. The secondary remote copy program 350 issues a request for read of the update data to the primary remote copy program 150 (S130). Timing of issuing this request for read of the update data is independent from the timing of updating the primary user data 120 and storing the updated data into the primary side file 180.

When a request for read is received from the intermediate processing section 300, the primary DKC 110 or the primary remote copy program 150 determines (chooses) an update data in an untransferred state for the secondary remote copy program 380 of the intermediate processing section 300 with reference to the primary copy object data management information 170, and transmits an update data in an untransferred state and the primary copy object data management information 170 accompanied with that data to the intermediate processing section 300 by the remote copy processing (S140).

The intermediate processing section 300 stores and accumulates the update data received from the primary DKC 110 by the remote copy processing in the storage area owned by the intermediate processing section 300 as the secondary side file 280. At the same time, the secondary copy object data management information 370 for the management of the update data accumulated as the secondary side file 380 is prepared from the primary copy object data management information 170 received together with the update data (S150). This processing is, for example, a processing in which a value of the update data storage address 73 within the received primary copy object data management 170 is changed to the storage address of the update data in the storage area within the intermediate processing section 300 so as to become the secondary copy object data management information 380.

Further, the data reflection program 21 operating on the secondary host 2 issues a read operation for requesting the intermediate processing section 300 to transfer the accumulation of the update data, if any, as the secondary side file 380. The data reflection program 21 issues a request for read of the update data to the secondary remote copy program 350 (S160). Timing of issuing this request for read of the update data is independent from the timing of storing the update data into the secondary side file 380.

When a request for read is received from the data reflection program 21 of the secondary host 20, the intermediate processing section 300 determines (chooses) the secondary side file 180 (update data) in an untransferred state for the secondary host 20 with reference to the secondary copy object data management information 270, and performs the processing of transmitting (reading by the secondary host 20) the update data in the transferred state and the secondary copy object data management information 370 accompanied with that data to the data reflection program 21 of the secondary host 20 (S170).

With respect to the update data received from the intermediate processing section 300 by the transfer (read) processing, based on the reference to the secondary copy object data management information 380 received with that data, the data reflection program 21 of the secondary host 20 decides the update data to be reflected on the secondary user data 220, and executes a write operation for reflecting, that is, writing the update data on the secondary user data 220 for the secondary DKC 210 (S180). At this time, the date reflection program 21 performs a conversion from the update address in the primary user data 120 to the update address in the corresponding secondary user data 220 with reference to the pair conversion information 22, and performs the write I/O for the secondary DKC 210 by including this converted update address.

In executing the above-described write operation, the secondary DKC 210 reflects, that is, writes the update data on the update address of the secondary user data 220 designated by the write I/O, thereby performing the data update of the secondary user data 220 (S190). Further, when performing the processing of writing, that is, committing the update data on the secondary user data 220, as described later, a data before update prior to writing the update data on the update position of the secondary user data 220 may be stored in a prescribed storage area (an old side file 240) within the secondary storage apparatus 200.

Further, accompanied with the execution of the write operation, the secondary host 20 performs the processing of writing the update information regarding the update of the secondary user data 220 on the secondary log data 230 (S200). The above-described processing procedures are repeated.

(Distance Delay Time)

Figure 5:
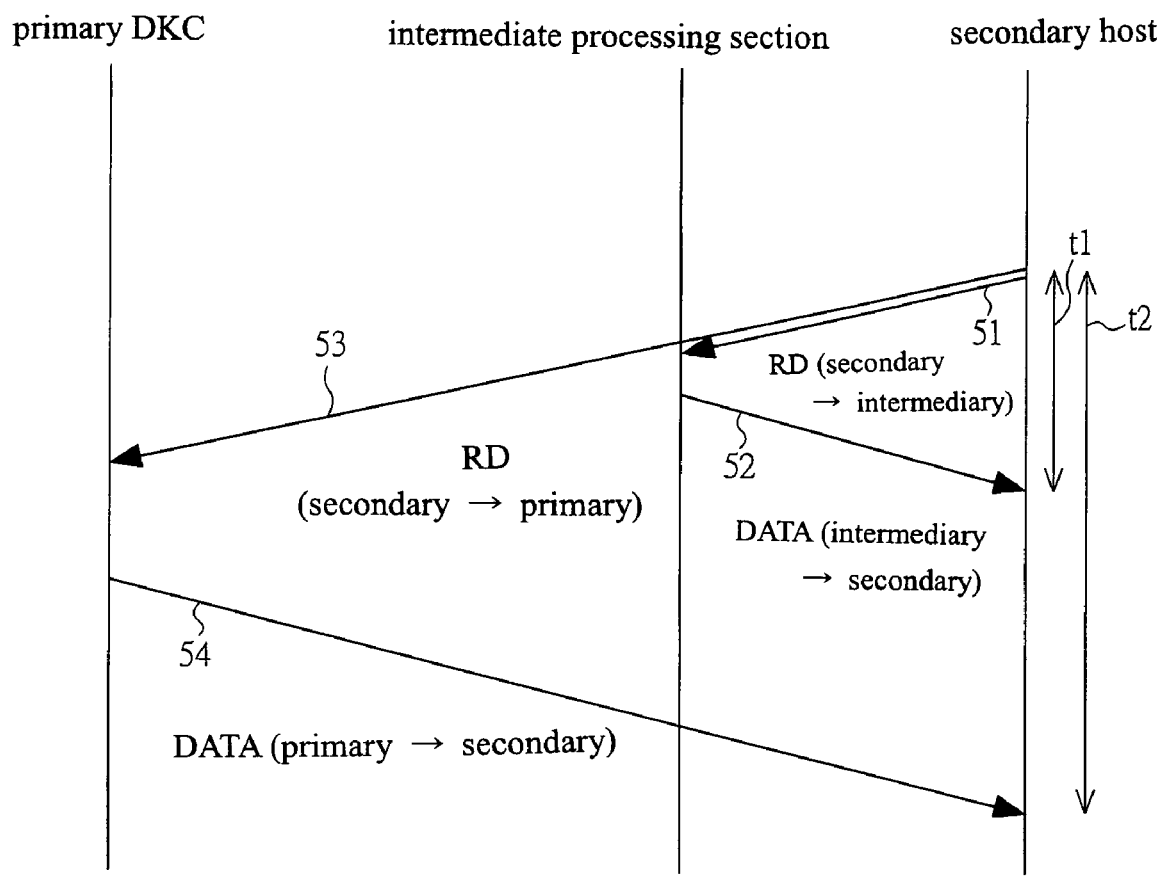
FIG. 5 is an explanatory drawing about a distance delay time needed when a secondary host reads an update data of a primary site in the data processing system according to one embodiment of the present invention.

FIG. 5 is an explanatory drawing to explain about a distance delay time needed for reading the update data at the primary site 1 by the secondary host 20 of the secondary site 2 in the data processing system of the present embodiment, and shows a difference of the efficiency and the loads of the communication for transmitting the update data particularly in the case where the intermediate processing section 300 is provided as with the case of the present embodiment and the case where it is not provided. Reference numeral 51 denotes a read command of the update data from the secondary host 20 to the intermediate processing section 300 in the data processing system of the present embodiment, and reference numeral 52 denotes a response of the update data from the intermediate processing section 300 to the secondary host 20. The time needed for the processing of transferring this update data is shown by t1. On the other hand, reference numeral 53 denotes an update data read command from the equivalent of the secondary host 20 to the equivalent of the primary DKC 110 in the secondary host base copy described as the prerequisite technology. Reference numeral 54 denotes a response of the update data from the equivalent of the primary DKC 110 to the equivalent of the secondary host 20. The time needed for the processing of transferring this update data is shown by t2. The difference between the secondary host base copy and the remote copy processing of the present embodiment is a time needed until the secondary host 20 finishes with obtaining the update data. A both-way distance delay time, in which the update data read command from the host 20 reaches the processing section for maintaining the update data and the update data is received by the secondary host 20, is calculated by one reciprocating time [ms]=0.01 [ms/km]×distance [km] except for the delay time by the line equipment on the communication link. For example, where the distance between the primary and secondary sites is 3000 miles (about 4800 km), the both-way distance delay time takes 48 ms. Consequently, a large gap of the distance between the primary storage apparatus and the secondary storage apparatus makes it difficult to balance the I/O in such a way to enable the secondary host computer to perform both the processing of reading the update data and the processing of reflecting the read update data on the secondary user data. With respect to the long distance data transfer between the primary and secondary sites in the present embodiment, since the update data may be transferred and stored in the intermediate processing section 300 located close to the secondary host 20 by the asynchronous remote copy processing initiated by the primary storage apparatus 100 and the secondary host 20 may perform the processing of reading the update data from the intermediate processing section 300, it is possible for the secondary host 20 to concentrate on the data reflection processing and the generation processing of the secondary log data 230, thereby preventing the processing efficiency of the secondary host 20 from deteriorating.

In the above-described data processing system of the present embodiment, the primary side file 180 and the primary copy object data management information 170 are generated by the primary storage apparatus 100, and, in the case of the secondary host base copy, the primary side file 180 to be maintained only at the primary site side, that is, the update data is transferred and accumulated in the intermediate processing section 300 at the secondary site side by the remote copy processing performed mainly by the primary storage apparatus 100, so that the absolute volume of the transfer data needed for the data duplication between the primary and secondary sites can be reduced and effectively transferred. At the same time, since the secondary host 20 may read the update data transferred and accumulated from the intermediate processing section 300 located at a nearby site and perform the reflection processing and the generation processing of the secondary log data 230, the slowness due to the distance delay time is eliminated and the reduction in the loads of the secondary host 20 can be realized. In this way, the role is divided among the asynchronous remote copy processing of the update data initiated by the primary storage apparatus 100, the reading and reflection of the update data performed mainly by the secondary host 20, and the generation processing of the secondary log data 230, so that the dispersion of the loads of both the hosts (10 and 20) is performed so as to balance the I/O. In the data transfer system of the present embodiment, the performance of the data transfer by the asynchronous remote copy processing initiated by the primary storage apparatus 100 is made the best use of, thereby effectively transferring the data needed for the data duplication, that is, the update data, and moreover, the data duplication can be performed while maintaining the data matching properties by ensuring the update ordinality.

The advantages and disadvantages of a storage base copy and a secondary host base copy as the prerequisite technology will be simply described so that the correspondence with the data processing system of the embodiment of the present invention is easy to understand. In the storage base copy and the secondary host base copy, since the load of the host computer accompanied with the transfer processing (remote copy) of the update data between the primary and secondary sites for the primary and secondary user data synchronization is absent or can be made small, the storage base copy and the secondary host base copy are provided as a remote copy technology for the data duplication among a plurality of sites provided with the storage apparatus.

In the storage base copy, the control section (disc controller) of the primary storage apparatus transmits the update data received from the primary host computer at the update time of the primary user data to the secondary storage apparatus side through the communication link without intermediacy of the primary host computer. The control section (disc controller) of the secondary storage apparatus performs the processing of reflecting the received update data on the secondary user data, that is, the processing of matching the secondary user data to the primary user data by writing a write data for the secondary user data on a portion corresponding to the update portion in the primary user data.

In this processing system, in the case of the remote copy of a synchronous mode which is the processing of transferring the update data to the secondary storage apparatus side or reflecting the update data on the secondary user data in synchronization with a host I/O processing for updating the user data (primary user data) performed by the primary host computer and the primary storage apparatus, at least the primary host computer can comprehend the completion of the data update on (data synchronization with) the secondary user data of the secondary storage apparatus through the completion of the data update on the primary user data of the primary storage apparatus. However, the host I/O processing for updating the data in the remote copy of the synchronous mode has a drawback in that, unless the reflection (writing) of the update data on the secondary data of the secondary storage apparatus is completed, the I/O processing is not completed, and therefore, as the distance between the primary and secondary sites becomes longer, so the time needed for the host I/O processing becomes slower and longer by the distanced delay time between the sites.

One of the solving means for a problem of slowness of the host I/O processing time by the distance delay time between the sites is an asynchronous remote copy, which is asynchronous with the host I/O processing for the data update, for performing the processing of transferring the update data of the primary user data from the primary site side to the secondary storage apparatus side and reflecting it on the secondary user data.

However, even in the case of the remote copy of any of the synchronous/asynchronous mode, to reduce the load of the primary host computer without intermediary of the primary host computer, the primary host computer does not dare to comprehend the update information in detail regarding the data update performed on the secondary user data at the secondary side site by the primary host computer. The update information is system information for managing the data update state, that is, the record (update log) such as a progress state of the update, an update history and the like, for example, the information such as the update time, an executed command and the like.

Consequently, in the storage base copy, when the primary host computer updates the primary user data of the primary storage apparatus, the update information generated by the primary host computer is also designated as the remote copy object and is remote-copied in the secondary storage apparatus. That is, by corresponding to the writing of the update data and the update information on the primary storage apparatus performed at the primary site, this update data and the update information are similarly written in the secondary storage by the remote copy. The existence of the update information on the secondary storage apparatus assists the host computer to comprehend a data update state on the secondary storage apparatus in the case where the data processing is re-started by using the secondary storage apparatus when failures occur at the primary site due to disturbances and the like and help the recovery operation of the system. Further, the data before and after the update in the data update time of the primary user data for performing the point-in-time-recovery processing, in which the data stored in the storage apparatus other than the update information can be restored to the data of a certain point of time, is perhaps also copied in the secondary storage apparatus. In this way, in the storage base copy, since various information needed for a system recovery operation at the secondary site side other than the update data on the primary user data at the primary site is transferred from the primary storage apparatus to the secondary storage apparatus, the volume of transfer increases accompanied with the increase in the volume of data maintained by the recent storage apparatus. Consequently, it is necessary for the communication line connecting between the primary and secondary sites to secure an ampler bandwidth than the volume of data such as the update data and the update information to be transferred or control the volume of transfer data below the bandwidth to be secured. However, the maintaining of an ampler volume of line connections invites the increase in the running cost of the system to perform the remote copy.

On the other hand, since the host base copy is different from the storage base copy, and performs a data update processing for the secondary user data of the secondary storage by using the update data read by the remote from the primary storage apparatus by the secondary host computer, the secondary host computer itself makes it possible to generate and maintain the update information regarding the data update of the secondary user data of the secondary storage apparatus. Further, it is also possible to accumulate the data before and after the update for performing the point-in-time-recovery processing. However, the position in which the secondary site is built up is, in general, a position far from the primary site in preparation for disasters and the like, and since the secondary host computer needs to be capable of controlling the load for performing the I/O processing for the update of the secondary user data of the secondary storage apparatus as well as the generation and accumulation of the update information in addition to the I/O processing for reading the update data from the primary storage apparatus located at a great distance, a large load is applied collectively to the secondary host computer. The data processing system of the embodiment of the present invention is structured by taking into consideration of the advantages and the disadvantages of both the systems as described above.

(Data Recovery Function)

Figure 6:
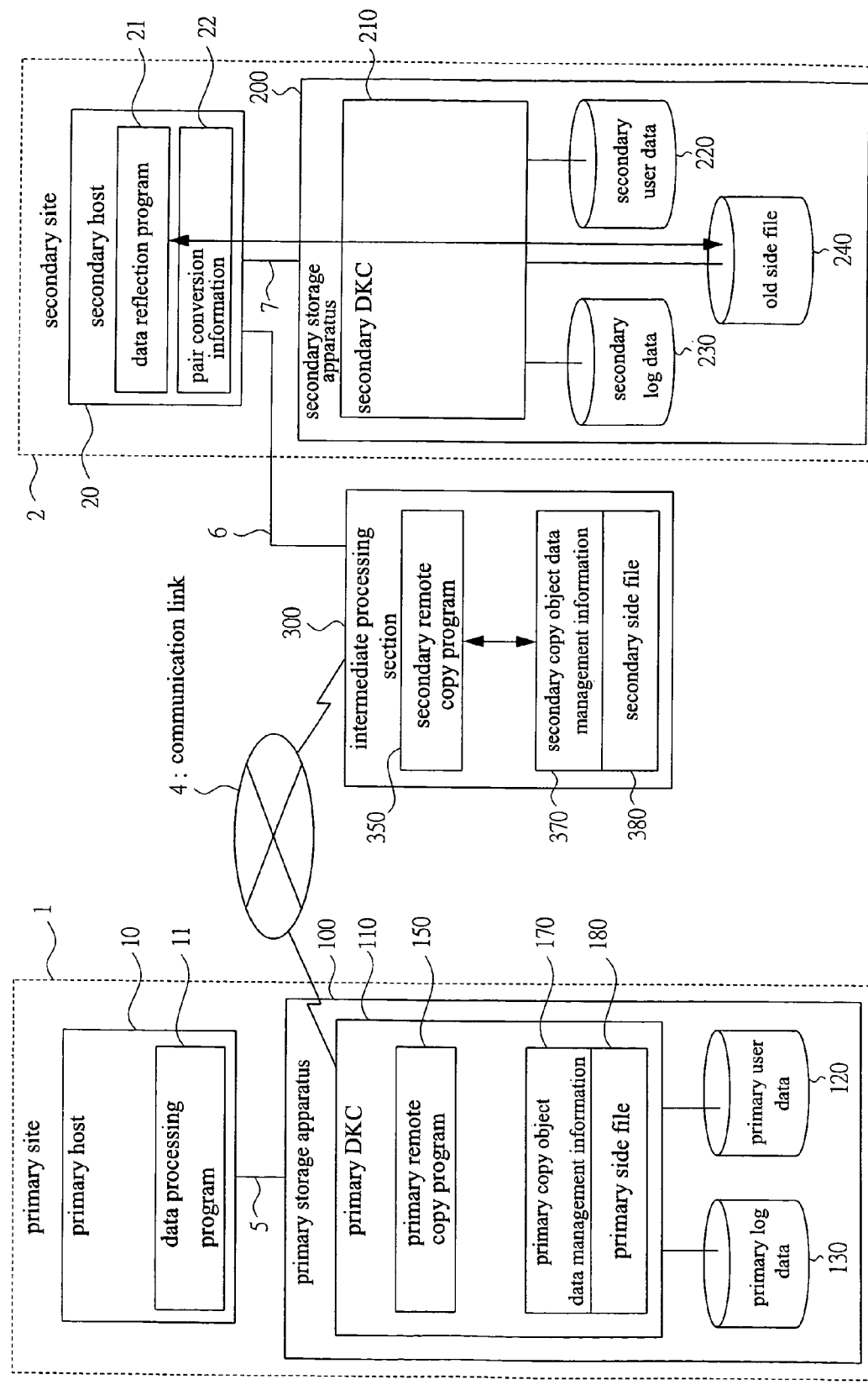
FIG. 6 shows a case where a data before the update at the update time of a secondary user data is stored in a storage area of a secondary storage apparatus as an old side file to realize a data recovery function at a secondary site in the data processing system according to one embodiment of the present invention.

FIG. 6 shows a case where, to realize a data recovery function at the secondary site 2, the data before the update at the update time of the secondary user data 220 is stored in the storage area of the secondary storage apparatus 200 as the old side file 240 in the data processing system in the representative embodiment of the present invention. In the secondary site 2, to perform the point-in-time-recovery, that is, the processing of recovering (restoring) the secondary user data 220 to the data of an original update point of time, the secondary host 20 allows the information including the data before the update at the time of updating the secondary user data 220 to be stored and maintained in the secondary storage apparatus 200 as the old side file 240.

The old side file 240 comprises the data before writing the update data on the secondary user data 220, that is, the data before the update and the management information given to this data by the data reflection program 21. This is simply a data written in the storage area from the secondary host 20 when seen from the secondary DKC 210.

When disasters and the like occur at the primary site 1, the processing of restoring the data to a data state of the update point of time in the past based on the secondary user data 220 can be performed at the secondary site 2. When the data reflection program 21 of the secondary host 20 restores the update settled secondary user data 220 to a data state of the update point of time in the past further than that data, the program 21 reads the data before the update maintained in the old side file 240 within the secondary storage apparatus 200, and based on the identifier of the update sequence, allows this data to be reflected in order in the secondary user data 220 by tracing back the update sequence in the primary and secondary user data in reverse order, thereby restoring this data to the data of the update point of time in the past.

Figure 7A:
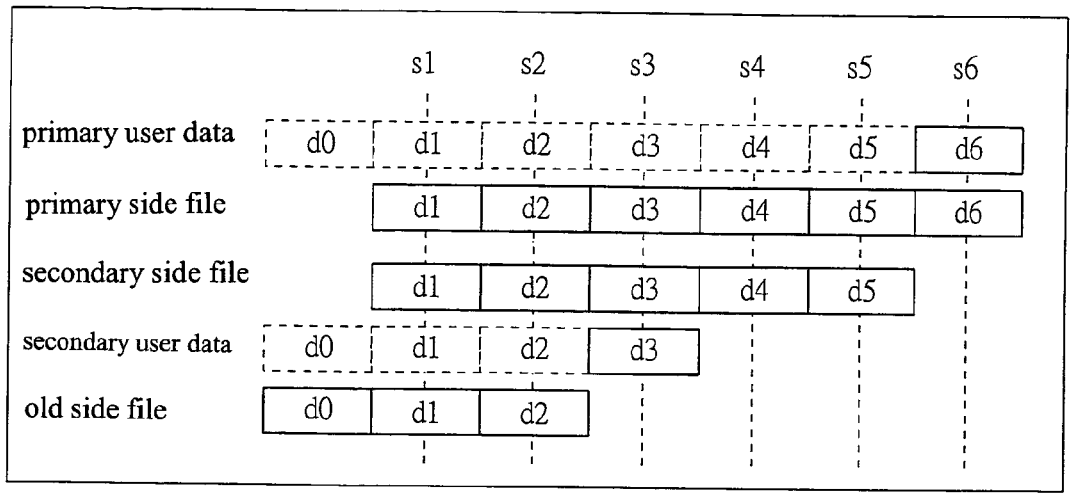
FIG. 7A is an explanatory drawing about a data recovery by using a secondary side file and the old side file to realize the data recovery function at the secondary site in the data processing system according to one embodiment of the present invention.
Figure 7B:
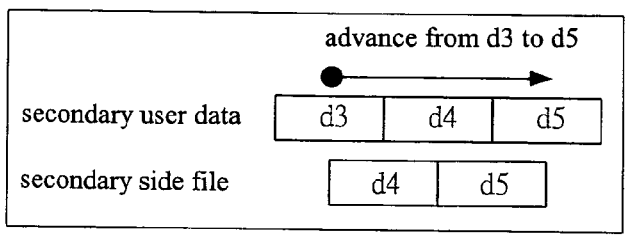
FIG. 7B is an explanatory drawing about a data recovery by using a secondary side file and the old side file to realize the data recovery function at the secondary site in the data processing system according to one embodiment of the present invention.
Figure 7C:
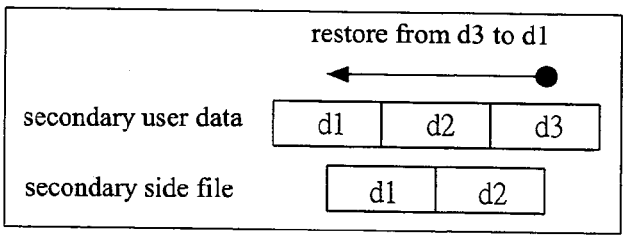
FIG. 7C is an explanatory drawing about a data recovery by using a secondary side file and the old side file to realize the data recovery function at the secondary site in the data processing system according to one embodiment of the present invention.

FIGS. 7A to 7C are views to explain about the data recovery processing by using the secondary user data 220 in the above-described secondary site 2. FIG. 7A shows the data to be maintained in the primary site 1, the intermediate processing section 300 and the secondary site 2 in correspondence to the update serial number showing the update sequence. Reference numerals s1 to s6 denote the update serial number issued at the update occurrence point of time at the primary user data 120, and reference numerals d1 to d6 denote the data content of the user data corresponding to each update. For example, in the primary user data 120 of the primary site 1, FIG. 7A shows that the primary user data 120 of the content d0 becomes the primary user data 120 of the content d1 by the update data of the content d1 due to the update of the update serial number s1. The update data of the content d1 is maintained in the primary side file 280 due to the update, and after that, is transferred to the secondary side file 380 of the intermediate processing section 300 through the remote copy processing asynchronous with this update. Further, the update data of the content d1 within the secondary side file 380 is read by the secondary host 20, and then, is reflected on the secondary user data 220 of the content d0, and becomes the secondary user data 220 of the contend d1. Further, together with the update of the secondary user data 220, the data of the content d0, which is the data before the update, is stored in the old side file 240.

Similarly, as a result of the update from the primary host 10 having occurred additionally five times on the primary user data 120 of the content d1, it is assumed that the primary user data 120 is turned into a state of the content d6 at the update serial number s6. At this time, the update data from d1 to d6 are maintained in the primary side file 180. Here, the timing of transferring the volume or number of update data maintained in the primary side file 180 and the secondary side file 380, and the copy object data, that is, the update data and its copy object data management information should not be took into consideration. In the intermediate processing section 300, the update data from d1 to d5 are received from the primary storage apparatus 100 and maintained in the secondary side file 380 by the remote copy processing. Further, the secondary host 20 reads the update data from the contents d1 to d3 (and its copy object data management information 170) from the secondary side file 380 of the intermediate processing section 300, and finishes with allowing them to be reflected on the secondary user data 220, and the secondary user data 220 is turned into a state of the content d3. Further, the data before the update of the contents d0 to d2 are stored in the old side file 240.

In the above-described state, the advancement of the update state of the secondary user data 220 to a certain update point of time is made possible by using the secondary side file 380 accumulated in the intermediate processing section 300. With respect to the secondary user data 220 of the content d3 at the update serial number s3, in order to advance the data update till the update serial number s5, the update data (the update data of contents d4 and d5) of the update serial numbers s4 and s5 left as the secondary side file 380 at the intermediate processing section 300 are transferred to the secondary storage apparatus 200 side so as to be read and written in the secondary user data 220 (FIG. 7B).

On the other hand, in order to restore the secondary user data 220 to a state of the update point of time at the update serial number s1, the secondary host 20 and the secondary DKC 210 read the data before the update maintained in the old side file 240, and performs the processing of writing the corresponding data before the update (the update data of the contents d3 and d2) on the secondary user data 220 in order of the update serial numbers s3 and s2. In this way, by having the secondary side file 380 and the old side file 240 on the secondary site 2 side, the data recovery function, particularly, the point-in-time-recovery function can be realized.

(Generation Management of the Update)

Figure 8:
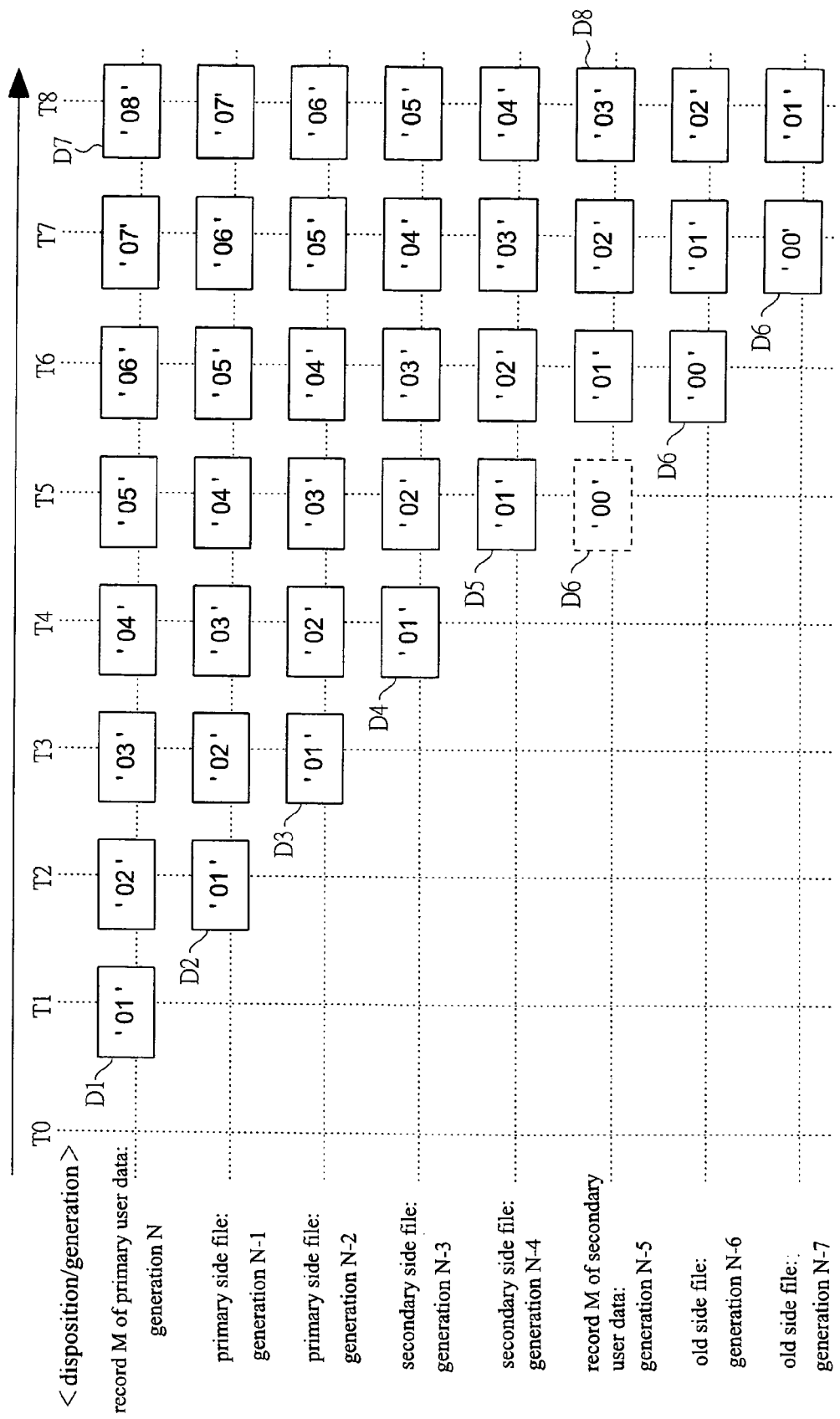
FIG. 8 is an explanatory drawing about a state in which an update is made for the data of the record from the primary host to the primary user data, and the update data is generation-managed and moved in following the time by the intermediate processing section and the secondary site in the data processing system according to one embodiment of the present invention.

FIG. 8 is a view to explain about a state in which an update is made from the primary host 10 for the data of a record M of the primary user data 120, and the update is generation-managed and moved in following the time by the intermediate processing section 300 and the secondary site 2. Here, an example of the update for a single record within the user data is cited. Further, the drawing shows a state in which, as an example, the update data for two generations are maintained in the primary side file 180, the secondary side file 380 and the old side file 240, respectively. Not limited to this, the number of generations of the update data possible to be maintained in the primary, secondary and old side files is expandable according to the numeric range expressible by the CPU used for constituting the data processing system to perform the present remote copy as well as the capacity of the securable storage area. In the drawing, a tetragon shown by D1 and other tetragons show an update data or its data state, and the value within the tetragon shows the corresponding update serial number 71.

First, at the point of time of a time T0 in an initial state, the date of the record M of the primary user data 120 is an initial data, and the update serial number 71 is void and does not exist.

At the time T1, the data of the record M of the primary user data 120 in the primary storage apparatus 100 receives a new update data from the primary host 10, and is updated so as to become a data D1. The update serial number 71 at that update time is taken as '01'. This update serial number 71 is recorded in the primary copy data management information 170 by the primary DKC 110 of the primary storage apparatus 100.

At the time T2, the data D1 of the record M of the primary user data 120 is copied or moved in the primary side file 180 before receiving the new update data from the primary host 10 (data 2), and the data for every update serial number is ensured. That is, the ensuring of the update ordinality of the update data is performed. After that, the update serial number, which is related to the data of the record M of the primary user data 120 updated by reception of the new update data from the primary host 10, is '02'. Assuming that the data lastly updated in the record M of the primary user data 120 is defined as the newest generation N, the generation of the data D2 of the update serial number '01' becomes N-1.

At the time T3, the data D2 of the update serial number '02' in the record M of the primary user data 120 is copied or moved to the primary side file 180 (data D3), and the update data, which becomes the update serial number '03' for the record M of the primary user data 120, is received from the primary host 10 and updated.

At the time T4, it is shown that the data D3 of the update serial number '01' written first in the record M of the primary user data 120 is transferred to the intermediate processing section 300 by the remote copy processing through the communication link 4, and is stored in the secondary file 380 (data D4). At this time, the copy data management information which records the update serial number '01' in the primary copy data management information 170 is also transmitted to the intermediate processing section 300 together with the update data in the primary side file 180, that is, the data D3 of the update serial number '01'.

At the time T5, similarly, it is shown that, while the data D5 of the update serial number '01' written first in the record M of the primary user data 120 is maintained, the data of the update serial number '02' is transferred to the intermediate processing section 300 by the remote copy processing through the communication link 4, and is stored in the secondary side file 380.

At the time T6, it is shown that the data D5 of the update serial number '01' written first in the record M of the primary user data 120 is transferred to the secondary host 20 by a read processing by the data reflection program 21 of the secondary host 20 from the secondary file 380, and is reflected on the corresponding secondary user data 220. The copy data management information to record the update serial number '01' in the secondary copy object data management information 370 is also transmitted to the secondary host 20 together with the update data in the secondary side file 380, that is, the data D5 of the update serial number '01'.

In this way, the data of the record M of the primary user data 120 is repeatedly updated from the time T1 to the time T8, and the update data is copied and moved from the primary side file 180 to the secondary side file 380, and further from the secondary side file 380 to the secondary user data 220, and as a result, when the data D7 of the update serial number '08' is written in the record M of the newest primary user data 120, a state in which up to the data D8 of the update serial number '03' is written in the secondary user data 220 is shown at the time T8.

The old side file 240 in the secondary site 2 maintains the data before writing the update data on the secondary user data 220, that is, the data before the update in behalf of the update data to be written (date after the update). At this time, the copy object data management information (the secondary copy object data management information 370) accompanied with the update data is also maintained together. The data D6 of the update serial number '00' shown by the times T5 to T7 in the drawing is the data before the update when the data of the update serial number '01' is written in the secondary user data 220.

Figure 9:
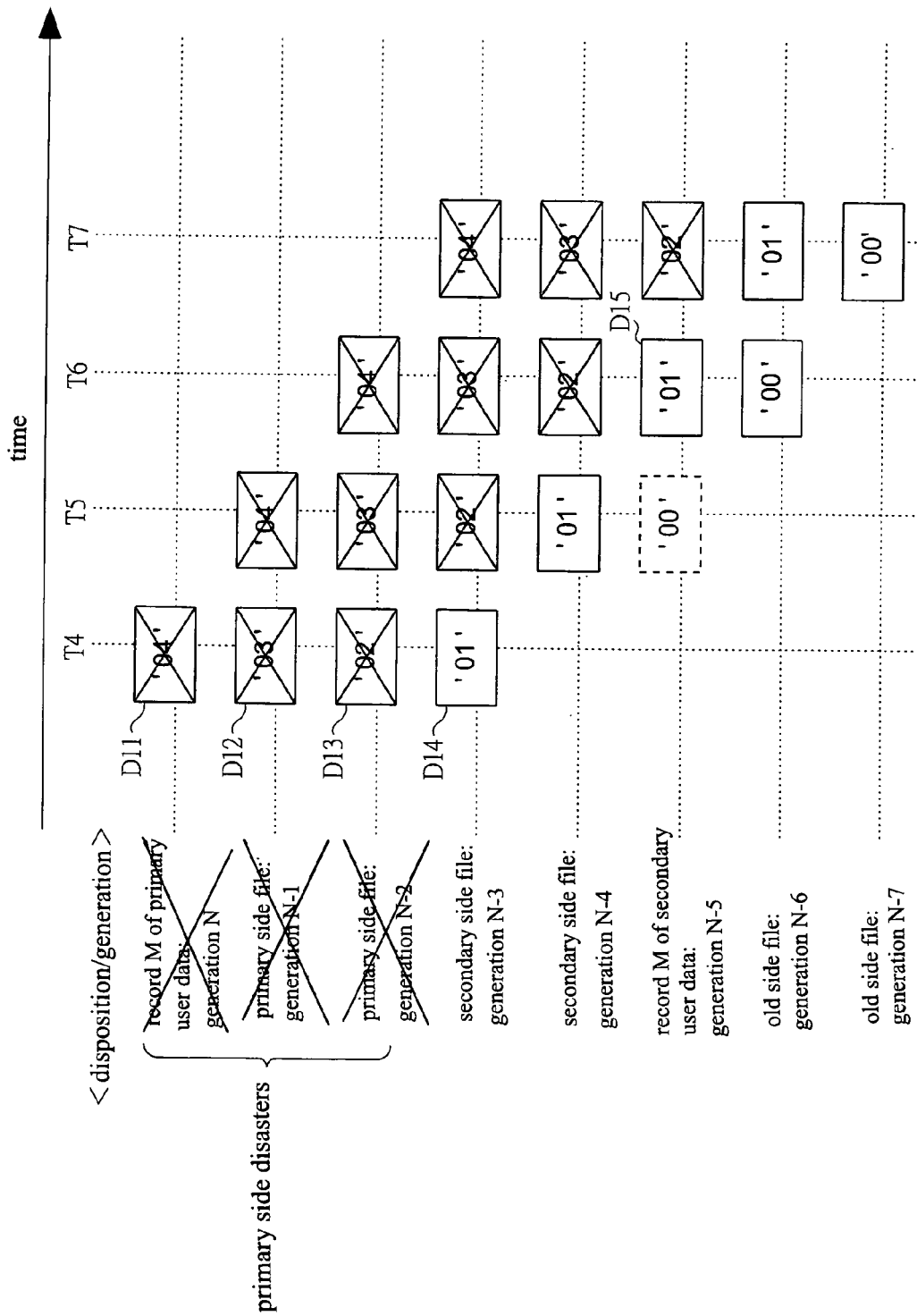
FIG. 9 is an explanatory drawing about an example of a data loss due to disturbances at a primary site when the update is made for the data of the record of the primary user data in the data processing system according to one embodiment of the present invention.

FIG. 9 shows an example of having lost the data D11 to D13 of the update serial numbers '02', '03' and '04' due to occurrence of the disturbances at the primary site 1 at the time T4 when the update is made for the record M of the primary user data 120 as described by using FIG. 8. At the time T4, the data D14 of the update serial number '01' having been maintained in the secondary side file 380 of the intermediate processing section 300 is written in the record M of the secondary user data 220 by the processing by the secondary host 20 and the secondary DKC 210 at the time T6 (data D15). Subsequent to the time T6, the update data to the record M of the secondary user data 220 does not reach the secondary site 2.

When performing the processing of restoring the data of the record M of the secondary user data 220 to a state of the point of time of the time T5, the host computer 20 traces back the data by the update serial number 71 from the copy object data management information (the secondary object data management information 370) maintained together with the data before update in the old side file 240 of the secondary storage apparatus 200 until a data having a time in the past further than the time T5 (the update serial number '05') is found. Based on the copy object data management information having the time T5 (update serial number '05') detected by this retrieval, the processing of writing back the data before the update within the old side file 380 on the secondary user data 220 is performed. This retrieval processing tracing back based on the copy object data management information from this old side file 240 can be realized by reading the copy object data management information by the data reflection program 21 of the secondary host 20 through the secondary DKC 210, that is, by performing a processing procedure in reverse of reading the secondary copy object data management information 370 and the secondary side file 380 from the intermediate processing section 300 and reflecting them on the secondary user data 220 by the operation of the remote copy processing.

In this way, in the data processing system of the present embodiment, the generation management of the data is effected by performing the processing of transferring in order the update data for every update serial number 71 among the primary site 1, the intermediate processing section 300 and the secondary site 2 and reflecting them on the secondary user data 220. Further, the transferring the update data between the primary storage apparatus 100 and the intermediate processing section 300 in relation to the timing of transferring and reflection the update data is performed, for example, by deciding the update data of the transfer object from the primary copy object data management information 170 based on a request for read of the update data from the intermediate processing section 300 to the primary DKC 110 of the primary storage apparatus 100. Alternatively, the transferring may be performed based on a request for transfer of the update data from the primary DKC 110 of the primary storage apparatus 100 to the intermediate processing section 300. The issuance of this request and the transfer of the update data are made, for example, for every definite period of time, and may be adequately performed when the load of the primary storage apparatus 100 and the intermediate processing section 300 is small or may be performed for every accumulation of the prescribed volume or number of update data in the storage area of the primary storage apparatus 100 and the intermediate processing section 300. Similarly, the processing of reading and reflecting the update data between the intermediate processing section 300 and the secondary host 20 may be performed, for example, by deciding the update data of the transfer object from the secondary copy object data management information 370 based on the request for transfer of the update data from the secondary host 20 to the intermediate processing section 300 or may be performed based on the request for transfer of the update data from the intermediate processing section 300 to the secondary host 20. Similarly, the issuance of the request and the transfer of the update data are made, for example, for every definite period of time or may be adequately made in a state when the load of the intermediate processing section 300, the secondary host 20 and the secondary DKC 210 of the secondary storage apparatus 200 is small or may be made for every accumulation of the prescribed volume or number of update data in the storage areas of the intermediate processing section 300, the secondary host 20, and the secondary storage apparatus 200.

(Disposition of Intermediate Processing Section)

Figure 10:
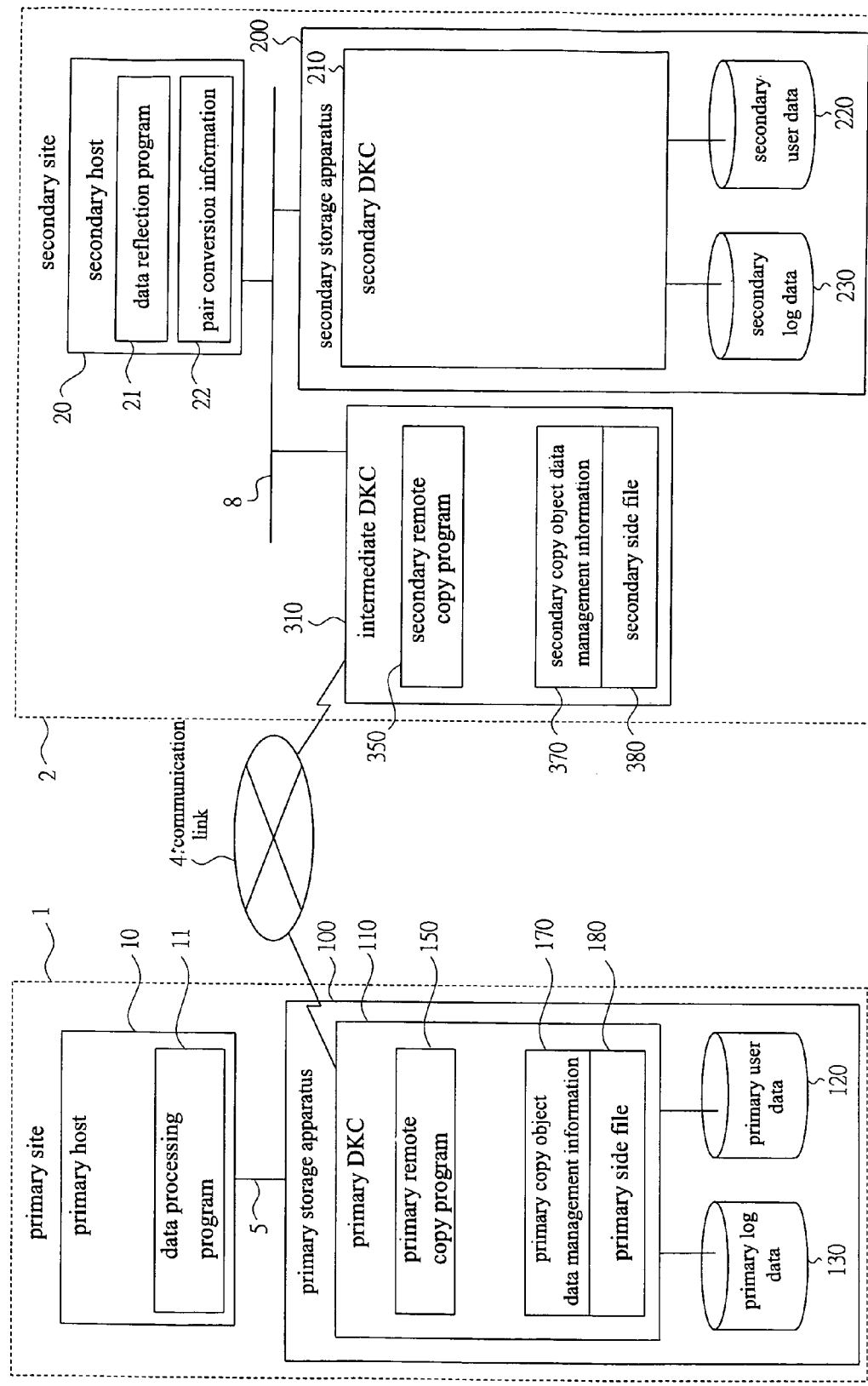
FIG. 10 is a view showing a whole constitution of the data processing system which is another embodiment of the present invention, and shows an embodiment in which the intermediate processing section is constituted as a part within the secondary site.

The data processing system of another embodiment of the present invention will be described. As another embodiment of the present invention, an intermediate processing section 300 may be constituted as a part within a secondary site 2. FIG. 10 shows the constitution of the data processing system of this embodiment. This data processing system adopts an embodiment in which a processing section having a function equivalent to the intermediate processing section 300 is disposed on a LAN (Local Area Network) 8 within the secondary site 2 as an intermediate DKC 310, and is connected to the secondary host 20 by a connection path on the LAN 8. The intermediate DKC 300 is a secondary DKC (disc controller) for a secondary DKC 210. The intermediate DKC 310 and the secondary DKC 210 may establish communication for the transfer and the like of the update data through the LAN 8. Other parts are the same as the above-described representative embodiment.

Another embodiment of the present invention may adopt such an embodiment in which the LAN 8 is constituted as a SAN (storage area network), which is used by connecting a storage apparatus by a network. The SAN is connected to a Fibre cable by a Fibre switch and the like. Further, the embodiment may be such that the SAN as the LAN 8 mounts the data of SCSI interface (a communication protocol by the computer and the storage apparatus) on the LAN such as Ethernet (registered trademark) and the like by a TCP/IP packet and establishes communication or the embodiment may be such that the intermediate processing section 300 and the second host 20 are connected by a dedicated channel.

Further, as another embodiment of the present invention, an intermediate processing section 300 may be constituted as a part of a secondary storage apparatus 200. FIG. 11 shows a constitution of the data processing system of this embodiment. This data processing system adopts an embodiment in which the intermediate processing section 300 is constituted as a part of a secondary DKC 210b of a secondary storage apparatus 200b with a secondary site 2. Through a communication like 4, a primary storage St 10 and a secondary storage apparatus 200 are connected, and the intermediate processing section 300 and a secondary host 20 establish communication through a connection path 7. The secondary DKC 210b has a data reflection program 211 for performing a processing corresponding to a data reflection program 21 within the secondary host 20. Other parts are the same as the above-described representative embodiment. In this embodiment, the secondary DKC 210b executes the secondary remote copy program 350, and accumulates the second side file 380 and the secondary copy object data management information 370.

Further, as another embodiment of the present invention, it may be constituted such that the intermediate processing section 300 is disposed as a processing section independent from the secondary site 2 in an intermediate site on the communication link between the primary and secondary sites. FIG. 12 shows a constitution of the data processing system of this embodiment. This data processing system adopts an embodiment in which the system has a processing site 3 between a primary site 1 and the secondary site 2, and the intermediate processing section 300 is disposed in the intermediate site 3, and the primary storage apparatus 100 and the intermediate processing section 300 are connected by a communication link 4b, and the intermediate processing section 300 and the secondary host 20 are connected by a communication link 6b. Other parts are the same as the above-described representative embodiment. Although not illustrated, in the data processing system of other embodiments also, similarly with the above-described representative embodiment, the old side file 240 may be stored and used in the storage area within the secondary storage apparatus.

In the data processing system of the above-described respective embodiments, although the embodiment may be such that the processing of reflecting the update data on the secondary user data 220 is performed with the data reflection program 21 of the secondary host 20 as a center, the reflection processing may be performed by the intermediate processing section 300 or the secondary DKC 210 as a center.

By the data processing system of the above-described embodiments, the data update management mechanism and the data recovery function are realized, in which the data transfer efficiency by the remote copy processing initiated by the primary storage apparatus 100 is made the best use of, and the volume of data transfer in the communication line between the primary and secondary sites is controlled, and the load given to both the primary and secondary hosts (10 and 20) is controlled, and moreover, the update information is generated and maintained at the secondary site 2 side without transmitting the system information such as the update information from the primary site 1 to the secondary site 2.

While the present invention made by the present inventors have been specifically described based on the embodiments, the invention is not limited to the above-described embodiments and it will be obvious to those skilled in the art that various changes and modifications are possible in the invention without departing from the spirit and scope thereof.

The present invention is applicable to the information processing system, which performs the duplication of the data between the sites in preparation for failures due to disasters and the like.

What is claimed is:

1. A data processing system, which maintains a duplication of a data between sites each having a host computer and a storage apparatus, comprising:

a primary site having a primary host computer and a primary storage apparatus, connected to the primary host computer, including a control section and a storage unit, wherein primary user data is stored in a storage area;

a secondary site having a secondary host computer and a secondary storage apparatus, connected to the secondary host computer, including a control section and a storage unit, wherein a duplicate of the primary user data is stored in a storage area as secondary user data; and an intermediate processing section, which is connected to the primary storage apparatus through a communication link and is connected to the secondary host computer;

wherein the control section of the primary storage apparatus accumulates update data in the storage area within the primary storage apparatus together with its management information when an update of the primary user data is performed based on a command from the primary host computer, wherein, being asynchronous with the update of the user data, the control section of the primary storage apparatus and the intermediate processing section perform remote-copy of or move and accumulate of the update data and its management information in the storage area of the intermediate processing section through the communication link, wherein the secondary host computer and the intermediate processing section commands the control section of the secondary storage apparatus to perform a processing to transfer the update data and its management information accumulated in the intermediate processing section to the secondary host computer and to reflect the transferred data on the secondary user data for updating, and wherein the management information is made to include therein an update serial number or an update time as an identifier of an update sequence of the primary user data, an update address of the primary user data, and a storage address of the update data.

2. A data processing system, which maintains a duplication of a data between sites each having a host computer and a storage apparatus, comprising:

a primary site having a primary host computer and a primary storage apparatus, connected to the primary host computer, including a control section and a storage unit, wherein primary user data is stored in a storage area;

a secondary site having a secondary host computer and a secondary storage apparatus, connected to the secondary host computer, including a control section and a storage unit, wherein a duplicate of the primary user data is stored in a storage area as secondary user data; and an intermediate processing section, which is connected to the primary storage apparatus through a communication link and is connected to the secondary host computer;

wherein the control section of the primary storage apparatus accumulates update data in the storage area within the primary storage apparatus together with its management information when an update of the primary user data is performed based on a command from the primary host computer, wherein, being asynchronous with the update of the user data, the control section of the primary storage apparatus and the intermediate processing section perform remote-copy of or move and accumulate of the update data and its management information in the storage area of the intermediate processing section through the communication link, wherein the secondary host computer and the intermediate processing section commands the control section of the secondary storage apparatus to perform a processing to transfer the update data and its management information accumulated in the intermediate processing section to the secondary host computer and to reflect the transferred data on the secondary user data for updating, wherein the control section of the primary storage apparatus makes the management information for managing an update data when the update of the primary user data is performed based on a command from the primary host computer, wherein the management information is made to include therein an update serial number or an update time as an identifier of an update sequence of the primary user data, an update address of the primary user data, and a storage address of the update data, and wherein the secondary host computer performs the processing of updating and reflecting the update data on the secondary user data based on the management information.

3. The data processing system according to claim 1, wherein the secondary host computer generates update information accompanied with the update of the secondary user data of the secondary storage apparatus and stores the information in the storage area within the secondary storage apparatus.

4. The data processing system according to claim 1, wherein the secondary host computer stores a data prior to the updating in the storage area within the secondary storage apparatus before writing the update data on an update position when the secondary user data of the secondary storage apparatus is updated, and wherein, when the secondary user data is desired to be restored to the data state as in the time of updating in the past, the secondary storage apparatus performs a processing of tracing the update sequence to reflect on the secondary user data with use of the data prior to the updating.

5. The data processing system according to claim 1, wherein the secondary host computer obtains the update data and its management information accumulated in the intermediate processing section when the secondary user data is desired to be advanced to the data state as in the time where the primary user data has been updated, and the secondary storage apparatus performs the processing of reflecting the update data and its management information on the secondary user data according to the update sequence.

6. The data processing system according to claim 1, wherein the remote copy or moving process by the control section of the primary storage apparatus and the intermediate processing section is performed such that a request from the intermediate processing section to the primary storage apparatus is issued and that, in response to the request, the primary storage apparatus retrieves and transmits the update data and its management information, which update data is to be transferred from the storage area based on the management information.

7. The data processing system according to claim 1, wherein the remote copy or moving process by the control section of the primary storage apparatus and the intermediate processing section is performed such that a request from the intermediate processing section to the primary storage apparatus is issued and that the primary storage apparatus retrieves and transmits the update data and its management information, which update data is to be transferred from the storage area based on the management information.

8. The data processing system according to claim 1, wherein the transfer and reflection process by the secondary host computer and intermediate processing section is performed such that a request from the secondary host computer to the intermediate processing section is issued and that, in response to the request, the intermediate processing section retrieves and transmits the update data and its management information, which update data is to be transferred from the storage area based on the management information.

9. The data processing system according to claim 1, wherein the intermediate processing section is provided within the secondary site independently from the secondary storage apparatus and is connected to the secondary host computer via a network or a channel.

10. The data processing system according to claim 1, wherein the intermediate processing section is provided inside the control section of the secondary storage within the secondary site.

11. The data processing system according to claim 1, wherein the intermediate processing section is disposed in an intermediate site located between the primary site and secondary site and is connected to the primary storage apparatus via first communication link and connected to the secondary host computer via a second communication link.

* * * * *